United States Patent
Fredholm

(10) Patent No.: US 10,954,154 B2
(45) Date of Patent: Mar. 23, 2021

(54) SHAPED GLASS LAMINATES AND METHODS FOR FORMING THE SAME

(71) Applicant: CORNING INCORPORATED, Corning, NY (US)

(72) Inventor: Michele Marie-Louise Fredholm, Vulaines sur Seine (FR)

(73) Assignee: CORNING INCORPORATED, Corning, NY (US)

(*) Notice: Subject to any disclaimer, the term of this patent is extended or adjusted under 35 U.S.C. 154(b) by 418 days.

(21) Appl. No.: 15/899,689

(22) Filed: Feb. 20, 2018

(65) Prior Publication Data

US 2018/0237326 A1    Aug. 23, 2018

Related U.S. Application Data

(60) Provisional application No. 62/586,938, filed on Nov. 16, 2017, provisional application No. 62/461,494, (Continued)

(51) Int. Cl.
*B32B 17/00* (2006.01)
*B32B 17/06* (2006.01)
(Continued)

(52) U.S. Cl.
CPC ........ *C03B 23/0252* (2013.01); *B32B 17/101* (2013.01); *B32B 17/1011* (2013.01); (Continued)

(58) Field of Classification Search
CPC ........ B32B 17/10036; B32B 17/10761; B32B 17/1077; B32B 17/10788; B32B 2250/03; (Continued)

(56) References Cited

U.S. PATENT DOCUMENTS 1,999,558 A    4/1935    Black
2,003,383 A    6/1935    Miller
(Continued)

FOREIGN PATENT DOCUMENTS

DE    102006042538 A1    3/2008
EP        618068 A1    3/1994
(Continued)

OTHER PUBLICATIONS

Linnhofer et al. "Light weight conventional automotive glazing", IBEC '97, Automotive Glass and Glazing, 1997. pp. 25-27.
(Continued)

*Primary Examiner* — Joanna Pleszczynska

(57) ABSTRACT

Embodiments of a laminate including a first curved glass substrate comprising a first viscosity (poises) at a temperature of 630° C.; a second curved glass substrate comprising a second viscosity that is greater than the first viscosity at a temperature of 630° C.; and an interlayer disposed between the first curved glass substrate and the second curved glass substrate, are disclosed. In one or more embodiments, the first curved glass substrate exhibits a first sag depth that is within 10% of a second sag depth of the second curved glass substrate. In one or more embodiments, the first glass substrate and the second glass substrate exhibit a shape deviation therebetween of about ±5 mm or less as measured by an optical three-dimensional scanner or exhibit minimal optical distortion. Embodiments of vehicles including such laminates and methods for making such laminates are also disclosed.

22 Claims, 14 Drawing Sheets

Related U.S. Application Data filed on Feb. 21, 2017, provisional application No. 62/461,080, filed on Feb. 20, 2017.

(51) Int. Cl.

| | | |
|---|---|---|
| *B32B 17/10* | (2006.01) | |
| *C03B 23/025* | (2006.01) | |
| *B60J 1/00* | (2006.01) | |
| *C03B 23/035* | (2006.01) | |
| *C03C 3/087* | (2006.01) | |
| *C03B 23/03* | (2006.01) | |

(52) U.S. Cl.
CPC .... *B32B 17/10036* (2013.01); *B32B 17/1077* (2013.01); *B32B 17/10082* (2013.01); *B32B 17/10119* (2013.01); *B32B 17/10137* (2013.01); *B32B 17/10761* (2013.01); *B32B 17/10788* (2013.01); *B32B 17/10889* (2013.01); *B60J 1/008* (2013.01); *C03B 23/025* (2013.01); *C03B 23/03* (2013.01); *C03B 23/0357* (2013.01); *C03C 3/087* (2013.01); *B32B 2250/03* (2013.01); *B32B 2250/40* (2013.01); *B32B 2605/006* (2013.01)

(58) Field of Classification Search
CPC .......... B32B 2250/40; B32B 2605/006; C03B 23/025; C03B 23/0252
See application file for complete search history.

(56) References Cited

U.S. PATENT DOCUMENTS

| | | | |
|---|---|---|---|
| 3,282,772 | A | 11/1966 | Davis, Sr. |
| 3,300,351 | A | 1/1967 | Richardson |
| 3,592,726 | A | 7/1971 | Blizard |
| 3,801,423 | A | 4/1974 | Van Laethem et al. |
| 3,806,400 | A | 4/1974 | Laethem |
| 4,075,381 | A | 2/1978 | Furukawa et al. |
| 4,119,424 | A | 10/1978 | Comperatore |
| 4,124,733 | A | 11/1978 | Melling et al. |
| 4,643,944 | A | 2/1987 | Agethen et al. |
| 4,817,347 | A | 4/1989 | Hand et al. |
| 4,985,099 | A | 1/1991 | Mertens et al. |
| 5,019,443 | A | 5/1991 | Hall |
| 5,178,659 | A | 1/1993 | Watanabe et al. |
| 5,383,990 | A | 1/1995 | Tsuji |
| 5,667,897 | A | 9/1997 | Hashemi et al. |
| 6,265,054 | B1 | 7/2001 | Bravet et al. |
| 6,280,847 | B1 | 8/2001 | Corkhill et al. |
| 7,638,011 | B2 | 12/2009 | Bolognese |
| 7,871,664 | B2 | 1/2011 | O'Connor et al. |
| 8,448,466 | B2 | 5/2013 | Funk et al. |
| 9,219,803 | B2 | 12/2015 | Zhang |
| 9,375,900 | B2 | 6/2016 | Tsuchiya et al. |
| 9,616,641 | B2 | 4/2017 | Cleary et al. |
| 9,694,563 | B2 | 7/2017 | Offermann et al. |
| 9,919,496 | B2 | 3/2018 | Michetti et al. |
| 10,307,992 | B2 | 6/2019 | Lestringant et al. |
| 2002/0106519 | A1 | 8/2002 | Takahura |
| 2004/0098946 | A1 | 5/2004 | Meerman |
| 2008/0318028 | A1 | 12/2008 | Winstanley et al. |
| 2010/0295330 | A1 | 11/2010 | Ferreira et al. |
| 2012/0017975 | A1 | 1/2012 | Giron et al. |
| 2012/0025559 | A1 | 2/2012 | Offermann et al. |
| 2012/0094084 | A1 | 4/2012 | Fisher et al. |
| 2013/0295358 | A1 | 11/2013 | Paulus et al. |
| 2014/0017455 | A1 | 1/2014 | Takagi et al. |
| 2014/0093702 | A1 | 4/2014 | Kitajima |
| 2014/0141206 | A1 | 5/2014 | Gillard et al. |
| 2015/0158277 | A1 | 6/2015 | Fisher et al. |
| 2015/0202854 | A1 | 7/2015 | Tsuchiya et al. |
| 2015/0246839 | A1 | 9/2015 | Leveque |
| 2015/0314571 | A1 | 11/2015 | Cites et al. |
| 2016/0060164 | A1 | 3/2016 | Kobayashi et al. |
| 2016/0136929 | A1 | 5/2016 | Meiss et al. |
| 2016/0250825 | A1 | 9/2016 | Cleary et al. |
| 2016/0250982 | A1 | 9/2016 | Fisher et al. |
| 2016/0257094 | A1 | 9/2016 | Lestringant et al. |
| 2016/0279904 | A1 | 9/2016 | Sienerth et al. |
| 2016/0297169 | A1 | 10/2016 | Notsu et al. |
| 2016/0332423 | A1 | 11/2016 | Yamada et al. |
| 2016/0354996 | A1 | 12/2016 | Alder et al. |
| 2017/0008377 | A1 | 1/2017 | Fisher et al. |
| 2017/0057205 | A1 | 3/2017 | Notsu et al. |
| 2017/0190152 | A1 | 7/2017 | Notsu et al. |
| 2017/0341970 | A1 | 11/2017 | Ishida et al. |
| 2018/0104932 | A1 | 4/2018 | Lu |
| 2018/0207911 | A1 | 7/2018 | Lampman et al. |
| 2018/0370194 | A1 | 12/2018 | Claireaux et al. |
| 2019/0134953 | A1 | 5/2019 | Oh et al. |

FOREIGN PATENT DOCUMENTS

| | | |
|---|---|---|
| EP | 3078488 A1 | 10/2016 |
| FR | 3012073 A1 | 4/2015 |
| GB | 2011316 A | 12/1978 |
| GB | 2078169 A | 1/1982 |
| JP | 64085757 A | 3/1989 |
| JP | 2001039743 A | 2/2001 |
| JP | 2007197288 A | 8/2007 |
| JP | 2016008161 A | 1/2016 |
| WO | 2013107706 A1 | 7/2013 |
| WO | 2014126251 A1 | 8/2014 |
| WO | 2014126252 A1 | 8/2014 |
| WO | 2014209861 A1 | 12/2014 |
| WO | 2017055470 A1 | 4/2017 |
| WO | 2017103471 A1 | 6/2017 |
| WO | 2017106081 A1 | 6/2017 |
| WO | 2018095693 A1 | 5/2018 |
| WO | 2018134608 A1 | 7/2018 |
| WO | 2018138503 A1 | 8/2018 |

OTHER PUBLICATIONS

Linnhofer et al. "Resistance of glazings to stone impact", Autotest '96, Jul. 1996. 4 pgs.

Shetty, "Failure probability of laminated architectural glazing due to combined loading of wind and debris impact", Engineering Failure Analysis 36, 2014. pp. 226-242.

International Search Report and Written Opinion PCT/US2018/018707 dated May 25, 2018.

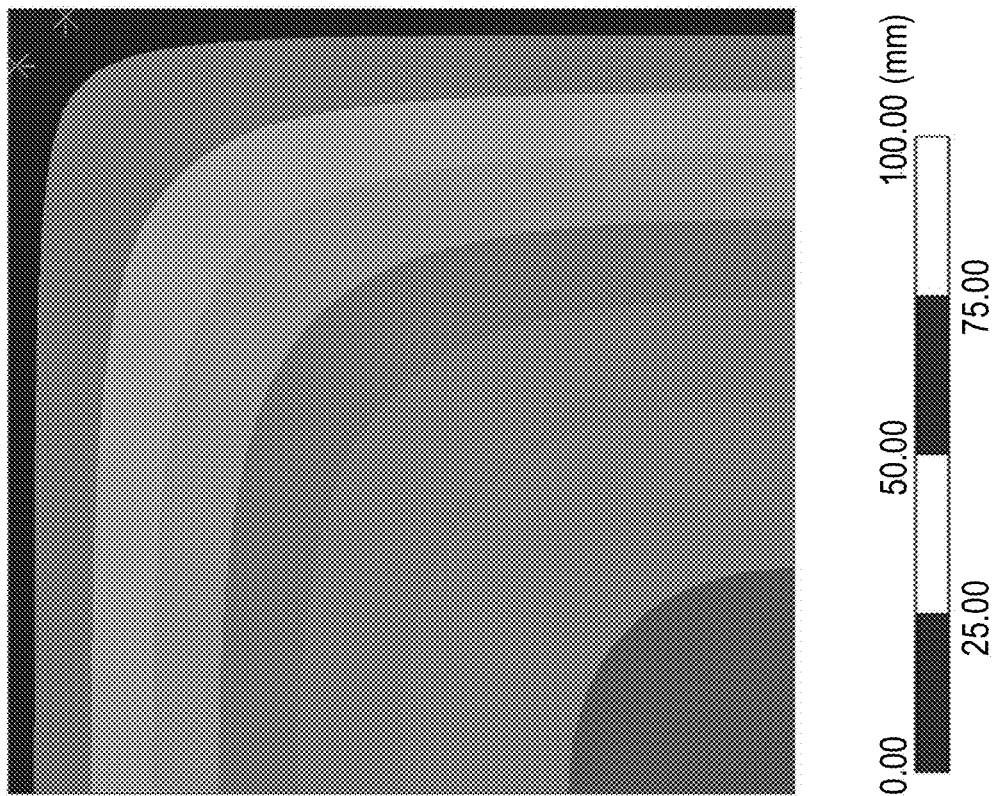

SHAPED GLASS LAMINATES AND METHODS FOR FORMING THE SAME

CROSS-REFERENCE TO RELATED APPLICATIONS

This application claims the benefit of priority under 35 U.S.C. § 119 of U.S. Provisional Application Ser. No. 62/586,938 filed on Nov. 16, 2017, U.S. Provisional Application Ser. No. 62/461,494 filed on Feb. 21, 2017, and U.S. Provisional Application Ser. No. 62/461,080 filed on Feb. 20, 2017, the content of which is relied upon and incorporated herein by reference in its entirety.

BACKGROUND

The disclosure relates to shaped glass laminates and methods for forming such laminates, and more particularly to shaped glass laminates including glass substrates that differ from one another and exhibit with minimal shape mismatch between one another.

A typical glass laminate is shown in FIG. 1 and includes a first curved glass substrate 110, a second curved glass substrate 120, and an intervening interlayer 130 disposed between the first curved glass substrate and the second curved glass substrate. Such laminates are typically formed by shaping or curving a first glass substrate and a second glass substrate simultaneously to provide a first curved glass substrate and a second glass substrate having a substantially similar or identical shape to one another. Various methods are used to shape the glass substrates including co-shaping which shape both glass substrates simultaneously by stacking by the glass substrates on top of one another to form a stack and co-shaping the stack. Methods of co-shaping include co-sagging which uses gravity to sag or shape a pair or stack of the first and second glass substrates simultaneously while heating the stack until the stack reaches a viscoelastic phase. Other methods include co-shaping using molds or a vacuum alone or in combination with one another or in combination with co-sagging.

One co-shaping example is illustrated in FIG. 2, which shows a bending frame 200 that has a first radius of curvature R1, and a second radius of curvature R2 to form a complexly curved glass substrate by co-sagging. To co-sag two glass substrates, such glass substrates are stacked on top of one another with intervening separation powder, which may include calcium carbonate. The stack is placed on the bending frame and the stack and bending frame are heated in a furnace until the glass substrates achieve a temperature equal to their softening temperature. At such a temperature, the glass substrates are bent or sagged by gravity. In some embodiments, a vacuum and/or mold can be used to facilitate co-sagging.

In such known laminates, the glass substrates have a thickness in a range from about 1.6 mm to about 3 mm. In some known laminates, the first glass substrate and the second glass substrate have respective compositions that are substantially identical or substantially similar to one another and thus properties similar to one another.

There is a need for laminates that are lightweight and thus thinner to reduce the weight of vehicles that incorporate such laminates. Accordingly, there is a need for laminates with thinner glass substrates and potentially laminates with two compositionally different glass substrates.

SUMMARY

A first aspect of this disclosure pertains to a laminate including a first curved glass substrate comprising a first major surface, a second major surface opposing the first major surface, a first thickness defined as the distance between the first major surface and second major surface, and a first sag depth of about 2 mm or greater, the first curved glass substrate comprising a first viscosity (poises) at a temperature of 630° C.; a second curved glass substrate comprising a third major surface, a fourth major surface opposing the third major surface, a second thickness defined as the distance between the third major surface and the fourth major surface, and a second sag depth of about 2 mm or greater, the second curved glass substrate comprising a second viscosity that is greater than the first viscosity at a temperature in a range from about 590° C. to about 650° C. (or at about 630° C.); and an interlayer disposed between the first curved glass substrate and the second curved strengthened glass substrate and adjacent the second major surface and third major surface. In one or more embodiments, the first sag depth is within 10% of the second sag depth and a shape deviation between the first glass substrate and the second glass substrate of ±5 mm or less as measured by an optical three-dimensional scanner, and wherein one of or both the first major surface and the fourth major surface exhibit an optical distortion of less than 200 millidiopters as measured by an optical distortion detector using transmission optics according to ASTM 1561, and wherein the first major surface or the second major surface comprises a membrane tensile stress of less than 7 MPa as measured by a surface stressmeter, according to ASTM C1279.

A second aspect of this disclosure pertains to a vehicle comprising: a body defining an interior and an opening in communication with the interior; laminate according to one or more embodiments disposed in the opening, wherein the laminate is complexly curved.

A third aspect of this disclosure pertains to a method for forming a curved laminate comprising: forming a stack comprising a first glass substrate comprising a first viscosity (poises) and a first sag temperature and a second glass substrate, the second glass substrate comprising a second viscosity that greater than the first viscosity at a temperature of 630° C.; and heating the stack and co-shaping the stack to form a co-shaped stack, the co-shaped stack comprising a first curved glass substrate having a first sag depth and a second curved glass substrate each having a second sag depth, wherein the first sag depth and the second sag depth are greater than 2 mm and within 10% of one another. In some embodiments, the second sag temperature that differs from the first sag temperature by about 5° C. or greater, about 10° C. or greater, about 15° C. or greater, about 20° C. or greater, about 25° C. or greater, about 30° C. or greater, or about 35° C. or greater.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 13 illustrates the changes in pressure magnitude across the area of the glass substrate stack with a temporary bond between the glass substrates from near the center point to a corner of the stack;

DETAILED DESCRIPTION

Reference will now be made in detail to various embodiments, examples of which are illustrated in the accompanying drawings.

Aspects of this disclosure pertain to glass laminates that are thin or have a reduced weight compared to conventional laminates, while exhibiting superior strength and meeting regulatory requirements for use in automotive and architectural applications. Conventional laminates include two soda lime silicate glass substrates having a thickness in a range from about 1.6 mm to about 3 mm. To reduce the thickness of at least one of the glass substrates, while maintaining or improving the strength and other performance of the laminate, one of the glass substrates can include a strengthened glass substrate which tends to have very different viscosity as a function of temperature (or viscosity curve) than the soda lime silicate glass substrate. In particular, typical strengthened glass substrates exhibit a significantly higher viscosity at a given temperature than soda lime silicate glass substrates.

It was previously believed that co-shaping, and in particular co-sagging, such differing glass substrates, was not possible due to the difference in viscosity curves. However, as will be described herein, such successful co-shaping (including co-sagging) can be achieved to form a laminate that exhibits substantially minimal shape mismatch, minimal stress due to co-shaping, and low or substantially low optical distortion.

It was also generally understood that a glass substrate with lower viscosity (e.g., soda lime silicate glass substrate) could be co-sagged with a higher viscosity glass substrate by positing the lower viscosity glass substrate on top of the higher viscosity glass substrate. In particular, it was believed that the opposite configuration, the lower viscosity glass substrate would sag to a deeper depth than the higher viscosity glass substrate. Surprisingly, as will be described herein, successful co-sagging can be achieved with this opposite configuration—that is, the higher viscosity glass substrate is placed on top of the lower viscosity glass substrate. Such co-sagged glass substrates exhibit substantially identical shapes, while achieving a deep or large sag depth, and can be laminated together with an interlayer between the glass substrates to form a shaped laminate exhibiting minimal optical and stress defects.

Figure 1:
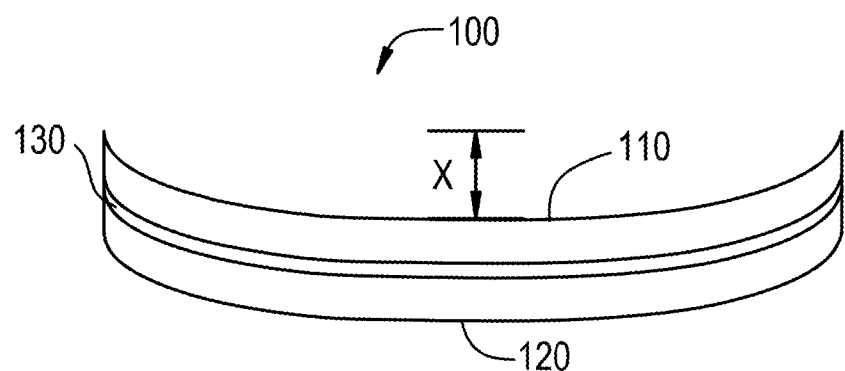
FIG. 1 is a side-view of a known glass laminate.
Figure 2:
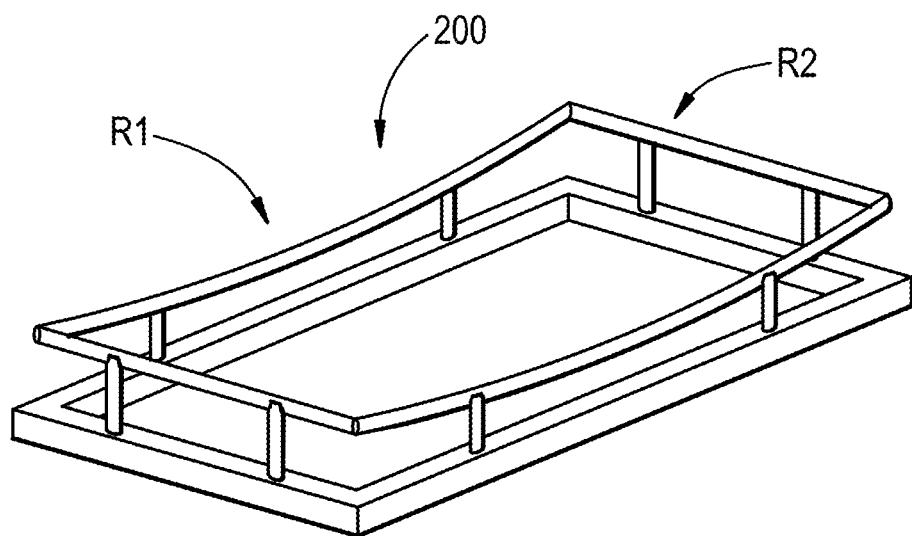
FIG. 2 is a perspective view of a known bending frame used to shape glass substrates and laminates
Figure 3:
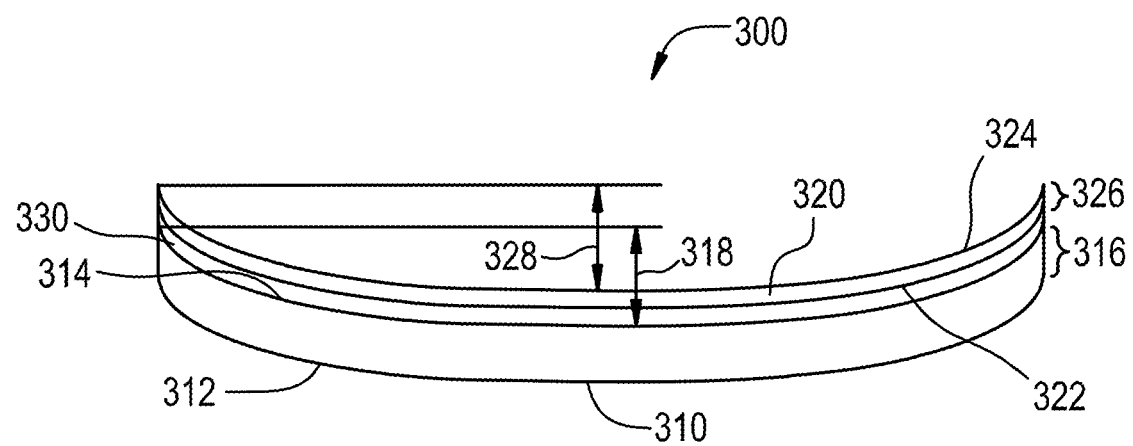
FIG. 3 is a side view of shaped laminate according to one or more embodiments.

As used herein, the phrase "sag depth" refers to the maximum distance between two points on the same convex surface of a curved glass substrate, as illustrated in FIG. 3 by reference characters "318" and "328". As illustrated in FIG. 3, the point on the convex surface at the edge and the point on the convex surface at or near the center of the convex surface provide the maximum distance 318 and 328.

A first aspect of this disclosure pertains to a laminate 300 comprising a first curved glass substrate 310, a second curved glass substrate 320 and an interlayer 330 disposed between the first curved glass substrate and the second curved glass substrate, as illustrated in FIG. 3. In one or more embodiments, the first curved glass substrate 310 includes a first major surface 312, a second major surface 314 opposing the first major surface, a minor surface 313 extending between the first major surface and the second major surface, a first thickness 316 defined as the distance between the first major surface and second major surface, and a first sag depth 318. In one or more embodiments, the first curved glass substrate 310 includes a peripheral portion 315 that extends from the minor surface 313 toward the internal portion of the first glass substrate. In one or more embodiments, the second curved glass substrate 320 includes a third major surface 322, a fourth major surface 324 opposing the third major surface, a minor surface 323 extending between the first major surface and the second major surface, a second thickness 326 defined as the distance between the third major surface and the fourth major surface, and a second sag depth 328. In one or more embodiments, the first curved glass substrate 310 includes a peripheral portion 325 that extends from the minor surface 323 toward the internal portion of the first glass substrate.

The first glass substrate 310 has a width defined as a first dimension of one of the first and second major surfaces that is orthogonal to the thickness, and a length defined as a second dimension of one of the first and second major surfaces orthogonal to both the thickness and the width. The first glass substrate 320 has a width defined as a first dimension of one of the first and second major surfaces that is orthogonal to the thickness, and a length defined as a second dimension of one of the first and second major surfaces orthogonal to both the thickness and the width. In one or more embodiments, the peripheral portion 315, 325 of one of or both the first and second glass substrates may have a peripheral length extending from the minor surface 313, 323 that is less than about 20% of the respective length and width dimensions of the first and second glass substrates. In one or more embodiments, the peripheral portion 315, 325 may have a peripheral length extending from the minor surface 313, 323 that is about 18% or less, about 16% or less, about 15% or less, about 14% or less, about 12% or less, about 10% or less, about 8% or less, or about 5% or less of the respective length and width dimensions of the first and second glass substrates.

In one or more embodiments, the interlayer 330 is disposed between the first curved glass substrate and the second curved glass substrate such that it is adjacent the second major surface 314 and third major surface 322, as shown in FIG. 3.

Figure 3A:
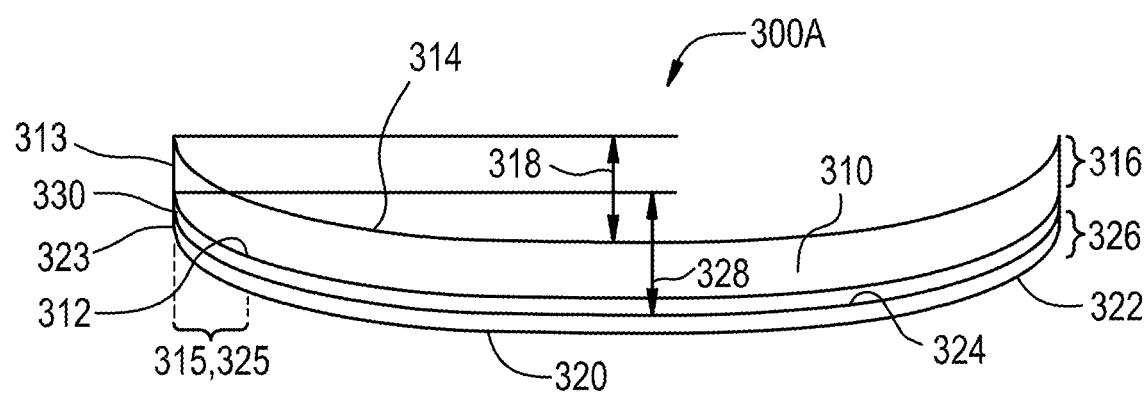
FIG. 3A is a side view of a shaped laminate according to one or more embodiments.

In the embodiment shown in FIG. 3, the first surface 312 forms a convex surface and the fourth surface 324 forms a concave surface. In the embodiment of the laminate 300A shown in FIG. 3A, the position of the glass substrates may be interchanged such that the interlayer 330 is disposed between the first curved glass substrate 310 and the second curved glass substrate 320 such that it is adjacent the first major surface 312 and fourth major surface 324. In such embodiments, the second surface 314 forms a convex surface and the third surface 322 forms a concave surface, as shown in FIG. 3A.

In one or more embodiments, the first curved glass substrate (or the first glass substrate used to form the first curved glass substrate) exhibits a first viscosity (in units of poise) and the second curved glass substrate (or the second glass substrate used to form the second curved glass substrate) exhibits a second viscosity (in units of poise) that differs from the first viscosity at a given temperature. The given temperature in some embodiments may be from about 590° C. to about 650° C. (or at about 630° C.). In some embodiments, the second viscosity is equal to or greater than about 2 times, about 3 times, about 4 times, about 5 times, about 6 times, about 7 times, about 8 times, about 9 times, or about 10 times the first viscosity, at a temperature of 630° C. In one or more embodiments, the second viscosity may be greater than or equal to 10 times the first viscosity at a given temperature. In one or more embodiments, the second viscosity is in a range from about 10 times the first viscosity to about 1000 times the first viscosity (e.g., from about 25 times to about 1000 times the first viscosity, from about 50 times to about 1000 times, from about 100 times to about 1000 times, from about 150 times to about 1000 times, from about 200 times to about 1000 times, from about 250 times to about 1000 times, from about 300 times to about 1000 times, from about 350 times to about 1000 times, from about 400 times to about 1000 times, from about 450 times to about 1000 times, from about 500 times to about 1000 times, from about 10 times to about 950 times, from about 10 times to about 900 times, from about 10 times to about 850 times, from about 10 times to about 800 times, from about 10 times to about 750 times, from about 10 times to about 700 times, from about 10 times to about 650 times, from about 10 times to about 600 times, from about 10 times to about 550 times, from about 10 times to about 500 times, from about 10 times to about 450 times, from about 10 times to about 400 times, from about 10 times to about 350 times, from about 10 times to about 300 times, from about 10 times to about 250 times, from about 10 times to about 200 times, from about 10 times to about 150 times, from about 10 times to about 100 times, from about 10 times to about 50 times, or from about 10 times to about 25 times the first viscosity.

In one or more embodiments in which the first glass substrate and/or the second glass substrate (or the first glass substrate and/or second glass substrate used to form the first curved glass substrate and second curved glass substrate, respectively) includes a mechanically strengthened glass substrate (as described herein), the first and/or second viscosity may be a composite viscosity.

In one or more embodiments, at 600° C., the first viscosity is in a range from about $3 \times 10^{10}$ poises to about $8 \times 10^{10}$ poises, from about $4 \times 10^{10}$ poises to about $8 \times 10^{10}$ poises, from about $5 \times 10^{10}$ poises to about $8 \times 10^{10}$ poises, from about $6 \times 10^{10}$ poises to about $8 \times 10^{10}$ poises, from about $3 \times 10^{10}$ poises to about $7 \times 10^{10}$ poises, from about $3 \times 10^{10}$ poises to about $6 \times 10^{10}$ poises, from about $3 \times 10^{10}$ poises to about $5 \times 10^{10}$ poises, or from about $4 \times 10^{10}$ poises to about $6 \times 10^{10}$ poises.

In one or more embodiments, at 630° C., the first viscosity is in a range from about $1 \times 10^9$ poises to about $1 \times 10^{10}$ poises, from about $2 \times 10^9$ poises to about $1 \times 10^{10}$ poises, from about $3 \times 10^9$ poises to about $1 \times 10^{10}$ poises, from about $4 \times 10^9$ poises to about $1 \times 10^{10}$ poises, from about $5 \times 10^9$ poises to about $1 \times 10^{10}$ poises, from about $6 \times 10^9$ poises to about $1 \times 10^{10}$ poises, from about $1 \times 10^9$ poises to about $9 \times 10^9$ poises, from about $1 \times 10^9$ poises to about $8 \times 10^9$ poises, from about $1 \times 10^9$ poises to about $7 \times 10^9$ poises, from about $1 \times 10^9$ poises to about $6 \times 10^9$ poises, from about $4 \times 10^9$ poises to about $8 \times 10^9$ poises, or from about $5 \times 10^9$ poises to about $7 \times 10^9$ poises.

In one or more embodiments, at 650° C., the first viscosity is in a range from about $5 \times 10^8$ poises to about $5 \times 10^9$ poises, from about $6 \times 10^8$ poises to about $5 \times 10^9$ poises, from about $7 \times 10^8$ poises to about $5 \times 10^9$ poises, from about $8 \times 10^8$ poises to about $5 \times 10^9$ poises, from about $9 \times 10^8$ poises to about $5 \times 10^9$ poises, from about $1 \times 10^9$ poises to about $5 \times 10^9$ poises, from about $1 \times 10^9$ poises to about $4 \times 10^9$ poises, from about $1 \times 10^9$ poises to about $3 \times 10^9$ poises, from about $5 \times 10^8$ poises to about $4 \times 10^9$ poises, from about $5 \times 10^8$ poises to about $3 \times 10^9$ poises, from about $5 \times 10^8$ poises to about $2 \times 10^9$ poises, from about $5 \times 10^8$ poises to about $1 \times 10^9$ poises, from about $5 \times 10^8$ poises to about $9 \times 10^8$ poises, from about $5 \times 10^8$ poises to about $8 \times 10^8$ poises, or from about $5 \times 10^8$ poises to about $7 \times 10^8$ poises.

In one or more embodiments, at 600° C., the second viscosity is in a range from about $2 \times 10^{11}$ poises to about $1 \times 10^{15}$ poises, from about $4 \times 10^{11}$ poises to about $1 \times 10^{15}$ poises, from about $5 \times 10^{11}$ poises to about $1 \times 10^{15}$ poises, from about $6 \times 10^{11}$ poises to about $1 \times 10^{15}$ poises, from about $8 \times 10^{11}$ poises to about $1 \times 10^{15}$ poises, from about $1 \times 10^{12}$ poises to about $1 \times 10^{15}$ poises, from about $2 \times 10^{12}$ poises to about $1 \times 10^{15}$ poises, from about $4 \times 10^{12}$ poises to about $1 \times 10^{15}$ poises, from about $5 \times 10^{12}$ poises to about $1 \times 10^{15}$ poises, from about $6 \times 10^{12}$ poises to about $1 \times 10^{15}$ poises, from about $8 \times 10^{12}$ poises to about $1 \times 10^{15}$ poises, from about $1 \times 10^{13}$ poises to about $1 \times 10^{15}$ poises, from about $2 \times 10^{13}$ poises to about $1 \times 10^{15}$ poises, from about $4 \times 10^{13}$ poises to about $1 \times 10^{15}$ poises, from about $5 \times 10^{13}$ poises to about $1 \times 10^{15}$ poises, from about $6 \times 10^{13}$ poises to about $1 \times 10^{15}$ poises, from about $8 \times 10^{13}$ poises to about $1 \times 10^{15}$ poises, from about $1 \times 10^{14}$ poises to about $1 \times 10^{15}$ poises, from about $2 \times 10^{11}$ poises to about $8 \times 10^{14}$ poises, from about $2 \times 10^{11}$ poises to about $6 \times 10^{14}$ poises, from about $2 \times 10^{11}$ poises to about $5 \times 10^{14}$ poises, from about $2 \times 10^{11}$ poises to about $4 \times 10^{14}$ poises, from about $2 \times 10^{11}$ poises to about $2 \times 10^{14}$ poises, from about $2 \times 10^{11}$ poises to about $1 \times 10^{14}$ poises, from about $2 \times 10^{11}$ poises to about $8 \times 10^{13}$ poises, from about $2 \times 10^{11}$ poises to about $6 \times 10^{13}$ poises, from about $2 \times 10^{11}$ poises to about $5 \times 10^{13}$ poises, from about $2 \times 10^{11}$ poises to about $4 \times 10^{13}$ poises, from about $2 \times 10^{11}$ poises to about $2 \times 10^{13}$ poises, from about $2 \times 10^{11}$ poises to about $1 \times 10^{13}$ poises, from about $2 \times 10^{11}$ poises to about $8 \times 10^{12}$ poises, from about $2 \times 10^{11}$ poises to about $6 \times 10^{12}$ poises, or from about $2 \times 10^{11}$ poises to about $5 \times 10^{12}$ poises.

In one or more embodiments, at 630° C., the second viscosity is in a range from about $2 \times 10^{10}$ poises to about $1 \times 10^{13}$ poises, from about $4 \times 10^{10}$ poises to about $1 \times 10^{13}$ poises, from about $5 \times 10^{10}$ poises to about $1 \times 10^{13}$ poises, from about $6 \times 10^{10}$ poises to about $1 \times 10^{13}$ poises, from about $8 \times 10^{10}$ poises to about $1 \times 10^{13}$ poises, from about $1 \times 10^{11}$ poises to about $1 \times 10^{13}$ poises, from about $2 \times 10^{11}$ poises to about $1 \times 10^{13}$ poises, from about $4 \times 10^{11}$ poises to about $1 \times 10^{13}$ poises, from about $5 \times 10^{11}$ poises to about $1 \times 10^{13}$ poises, from about $6 \times 10^{11}$ poises to about $1 \times 10^{13}$ poises, from about $8 \times 10^{11}$ poises to about $1 \times 10^{13}$ poises, from about $1 \times 10^{12}$ poises to about $1 \times 10^{13}$ poises, from about $2 \times 10^{10}$ poises to about $8 \times 10^{12}$ poises, from about $2 \times 10^{10}$ poises to about $6 \times 10^{12}$ poises, from about $2 \times 10^{10}$ poises to about $5 \times 10^{12}$ poises, from about $2 \times 10^{10}$ poises to about $4 \times 10^{12}$ poises, from about $2 \times 10^{10}$ poises to about $2 \times 10^{12}$ poises, from about $2 \times 10^{10}$ poises to about $1 \times 10^{12}$ poises, from about $2 \times 10^{10}$ poises to about $8 \times 10^{11}$ poises, from about $2 \times 10^{10}$ poises to about $6 \times 10^{11}$ poises, from about $2 \times 10^{10}$ poises to about $5 \times 10^{11}$ poises, from about $2 \times 10^{10}$ poises to about $4 \times 10^{11}$ poises, or from about $2 \times 10^{10}$ poises to about $2 \times 10^{11}$ poises.

In one or more embodiments, at 650° C., the second viscosity is in a range from about $1 \times 10^{10}$ poises to about $1 \times 10^{13}$ poises, from about $2 \times 10^{10}$ poises to about $1 \times 10^{13}$ poises, from about $4 \times 10^{10}$ poises to about $1 \times 10^{13}$ poises, from about $5 \times 10^{10}$ poises to about $1 \times 10^{13}$ poises, from about $6 \times 10^{10}$ poises to about $1 \times 10^{13}$ poises, from about $8 \times 10^{10}$ poises to about $1 \times 10^{13}$ poises, from about $1 \times 10^{11}$ poises to about $1 \times 10^{13}$ poises, from about $2 \times 10^{11}$ poises to about $1 \times 10^{13}$ poises, from about $4 \times 10^{11}$ poises to about $1 \times 10^{13}$ poises, from about $4 \times 10^{11}$ poises to about $1 \times 10^{13}$ poises, from about $5 \times 10^{11}$ poises to about $1 \times 10^{13}$ poises, from about $6 \times 10^{11}$ poises to about $1 \times 10^{13}$ poises, from about $8 \times 10^{11}$ poises to about $1 \times 10^{13}$ poises, from about $1 \times 10^{12}$ poises to about $1 \times 10^{13}$ poises, from about $1 \times 10^{10}$ poises to about $8 \times 10^{12}$ poises, from about $1 \times 10^{10}$ poises to about $6 \times 10^{12}$ poises, from about $1 \times 10^{10}$ poises to about $5 \times 10^{12}$ poises, from about $1 \times 10^{10}$ poises to about $4 \times 10^{12}$ poises, from about $1 \times 10^{10}$ poises to about $2 \times 10^{12}$ poises, from about $1 \times 10^{10}$ poises to about $1 \times 10^{12}$ poises, from about $1 \times 10^{10}$ poises to about $8 \times 10^{11}$ poises, from about $1 \times 10^{10}$ poises to about $6 \times 10^{11}$ poises, from about $1 \times 10^{10}$ poises to about $5 \times 10^{11}$ poises, from about $1 \times 10^{10}$ poises to about $4 \times 10^{11}$ poises, from about $1 \times 10^{10}$ poises to about $2 \times 10^{11}$ poises, or from about $1 \times 10^{10}$ poises to about $1 \times 10^{11}$ poises.

Figure 4:
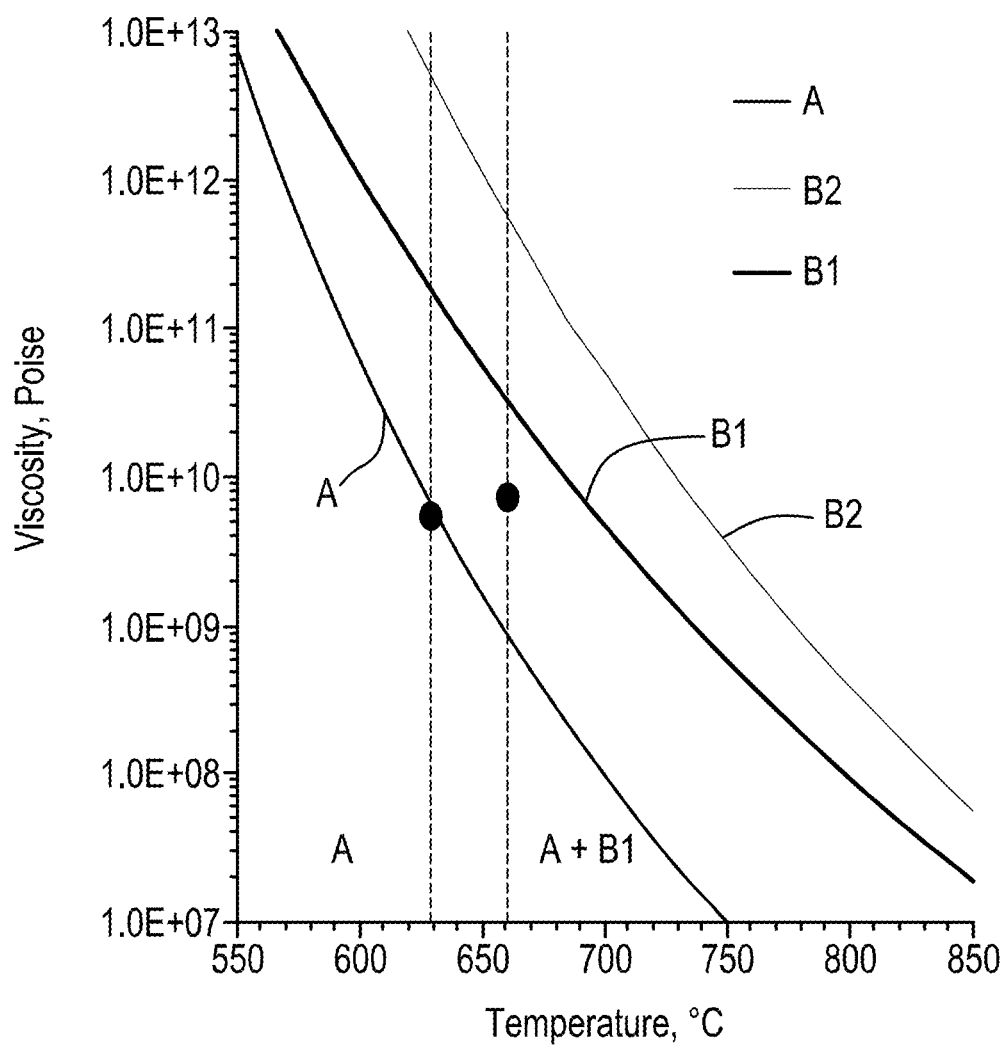
FIG. 4 is a graph showing the viscosity of three different glass substrates as a function of temperature.

An example of viscosity as a function of temperature of an exemplary first curved glass substrate (designated A) and two exemplary second curved glass substrates (designated B1 and B2) are shown in FIG. 4.

In one or more embodiments, the combination of the first glass substrate and the second glass substrate (or the stack thereof) may exhibit an effective viscosity that is between the first viscosity and the second viscosity at a temperature (T) in a range from about 500° C. to about 700° C. The effective viscosity may be determined by equation (1), as follows:

$$\mu_{eff}(T) = ((\mu_1(T)t_1)/(t_1+t_2)) + ((\mu_2(T)t_2)/(t_1+t_2)), \quad \text{Equation (1):}$$

where $\mu_1(T)$ is the viscosity of the first curved glass substrate at temperature (T), $t_1$ is the thickness of the first curved glass substrate, $\mu_2(T)$ is the viscosity of the second curved glass substrate at temperature (T), $t_2$ is the thickness of the second curved glass substrate.

In one or more embodiments, the first curved substrate and the second curved substrate (or the first glass substrate and the second glass substrate used to form the first curved glass substrate and the second curved glass substrate, respectively) may have a sag temperature that differs from one another. As used herein, "sag temperature" means the temperature at which the viscosity of the glass substrate is about $10^{9.9}$ poises. The sag temperature is determined by fitting the Vogel-Fulcher-Tamman (VFT) equation: Log h=A+B/(T−C), where T is the temperature, A, B and C are fitting constants and h is the dynamic viscosity, to annealing point data measured using the bending beam viscosity (BBV) measurement, to softening point data measured by fiber elongation. In one or more embodiments, the first curved glass substrate (or the first glass substrate used to form the first curved glass substrate) may have a first sag temperature and the second curved glass substrate (or the second glass substrate used to form the second curved glass substrate) has a second sag temperature that is greater than the first sag temperature. For example, the first sag temperature may be in a range from about 600° C. to about 650° C., from about 600° C. to about 640° C., from about 600° C. to about 630° C., from about 600° C. to about 625° C., from about 600° C. to about 620° C., from about 610° C. to about 650° C., from about 620° C. to about 650° C., from about 625° C. to about 650° C., from about 630° C. to about 650° C., from about 620° C. to about 640° C., or from about 625° C. to about 635° C. In one or more embodiments, the second sag temperature may be greater than about 650° C. (e.g., from greater than about 650° C. to about 800° C., from greater than about 650° C. to about 790° C., from greater than about 650° C. to about 780° C., from greater than about 650° C. to about 770° C., from greater than about 650° C. to about 760° C., from greater than about 650° C. to about 750° C., from greater than about 650° C. to about 740° C., from greater than about 650° C. to about 740° C., from greater than about 650° C. to about 730° C., from greater than about 650° C. to about 725° C., from greater than about 650° C. to about 720° C., from greater than about 650° C. to about 710° C., from greater than about 650° C. to about 700° C., from greater than about 650° C. to about 690° C., from greater than about 650° C. to about 680° C., from about 660° C. to about 750° C., from about 670° C. to about 750° C., from about 680° C. to about 750° C., from about 690° C. to about 750° C., from about 700° C. to about 750° C., from about 710° C. to about 750° C., or from about 720° C. to about 750° C.

In one or more embodiments, the difference between the first sag temperature and the second sag temperature is about 5° C. or greater, about 10° C. or greater, about 15° C. or greater, about 20° C. or greater, about 25° C. or greater, about 30° C. or greater, or about 35° C. or greater. For example, the difference between the first sag temperature and the second sag temperature is in a range from about 5° C. to about 150° C., from about 10° C. to about 150° C., from about 15° C. to about 150° C., from about 20° C. to about 150° C., from about 25° C. to about 150° C., from about 30° C. to about 150° C., from about 40° C. to about 150° C., from about 50° C. to about 150° C., from about 60° C. to about 150° C., from about 80° C. to about 150° C., from about 100° C. to about 150° C., from about 5° C. to about 140° C., from about 5° C. to about 120° C., from about 5° C. to about 100° C., from about 5° C. to about 80° C., from about 5° C. to about 60° C., or from about 5° C. to about 50° C.

In one or more embodiments, one or both the first sag depth 318 and the second sag depth 328 is about 2 mm or greater. For example, one or both the first sag depth 318 and the second sag depth 328 may be in a range from about 2 mm to about 30 mm, from about 4 mm to about 30 mm, from about 5 mm to about 30 mm, from about 6 mm to about 30 mm, from about 8 mm to about 30 mm, from about 10 mm to about 30 mm, from about 12 mm to about 30 mm, from about 14 mm to about 30 mm, from about 15 mm to about 30 mm, from about 2 mm to about 28 mm, from about 2 mm to about 26 mm, from about 2 mm to about 25 mm, from about 2 mm to about 24 mm, from about 2 mm to about 22 mm, from about 2 mm to about 20 mm, from about 2 mm to about 18 mm, from about 2 mm to about 16 mm, from about 2 mm to about 15 mm, from about 2 mm to about 14 mm, from about 2 mm to about 12 mm, from about 2 mm to about 10 mm, from about 2 mm to about 8 mm, from about 6 mm to about 20 mm, from about 8 mm to about 18 mm, from about 10 mm to about 15 mm, from about 12 mm to about 22 mm, from about 15 mm to about 25 mm, or from about 18 mm to about 22 mm.

In one or more embodiments, the first sag depth 318 and the second sag depth 328 are substantially equal to one another. In one or more embodiments, the first sag depth is within 10% of the second sag depth. For example, the first sag depth is within 9%, within 8%, within 7%, within 6% or within 5% of the second sag depth. For illustration, the second sag depth is about 15 mm, and the first sag depth is in a range from about 14.5 mm to about 16.5 mm (or within 10% of the second sag depth).

In one or more embodiments, the first curved glass substrate and the second curved glass substrate comprise a shape deviation therebetween the first glass substrate and the second glass substrate of ±5 mm or less as measured by an optical three-dimensional scanner such as the ATOS Triple Scan supplied by GOM GmbH, located in Braunschweig, Germany. In one or more embodiments, the shape deviation is measured between the second surface 314 and the third surface 322, or between the first surface 312 and the fourth surface 324. In one or more embodiments, the shape deviation between the first glass substrate and the second glass substrate is about ±4 mm or less, about ±3 mm or less, about ±2 mm or less, about ±1 mm or less, about ±0.8 mm or less, about ±0.6 mm or less, about ±0.5 mm or less, about ±0.4 mm or less, about ±0.3 mm or less, about ±0.2 mm or less, or about ±0.1 mm or less. As used herein, the shape deviation refers to the maximum shape deviation measured on the respective surfaces.

In one or more embodiments, one of or both the first major surface 312 and the fourth major surface 324 exhibit minimal optical distortion. For example, one of or both the first major surface 312 and the fourth major surface 324 exhibit less than about 400 millidiopters, less than about 300 millidiopters, or less than about 250 millidiopters, as measured by an optical distortion detector using transmission optics according to ASTM 1561. A suitable optical distortion detector is supplied by ISRA VISIION AG, located in Darmstadt, Germany, under the tradename SCREENSCAN-Faultfinder. In one or more embodiments, one of or both the first major surface 312 and the fourth major surface 324 exhibit about 190 millidiopters or less, about 180 millidiopters or less, about 170 millidiopters or less, about 160 millidiopters or less, about 150 millidiopters or less, about 140 millidiopters or less, about 130 millidiopters or less, about 120 millidiopters or less, about 110 millidiopters or less, about 100 millidiopters or less, about 90 millidiopters or less, about 80 millidiopters or less, about 70 millidiopters or less, about 60 millidiopters or less, or about 50 millidiopters or less. As used herein, the optical distortion refers to the maximum optical distortion measured on the respective surfaces.

In one or more embodiments, the first major surface or the second major surface of the first curved glass substrate exhibits low membrane tensile stress. Membrane tensile stress can occur during cooling of curved substrates and laminates. As the glass cools, the major surfaces and edge surfaces (orthogonal to the major surfaces) can develop surface compression, which is counterbalanced by a central region exhibiting a tensile stress. Bending or shaping can introduce additional surface tension near the edge and causes the central tensile region to approach the glass surface. Accordingly, membrane tensile stress is the tensile stress measured near the edge (e.g., about 10-25 mm from the edge surface). In one or more embodiments, the membrane tensile stress at the first major surface or the second major surface of the first curved glass substrate is less than about 7 megaPascals (MPa) as measured by a surface stress meter according to ASTM C1279. An example of such a surface stress meter is supplied by Strainoptic Technologies under the trademark GASP® (Grazing Angle Surface Polarimeter). In one or more embodiments, the membrane tensile stress at the first major surface or the second major surface of the first curved glass substrate is about 6 MPa or less, about 5 MPa or less, about 4 MPa or less, or about 3 MPa or less. In one or more embodiments, the lower limit of membrane tensile stress is about 0.01 MPa or about 0.1 MPa. As recited herein, stress is designated as either compressive or tensile, with the magnitude of such stress provided as an absolute value.

In one or more embodiments, the membrane compressive stress at the first major surface or the second major surface of the first curved glass substrate is less than about 7 megaPascals (MPa) as measured by a surface stress meter according to ASTM C1279. A surface stress meter such as the surface stress meter supplied by Strainoptic Technologies under the trademark GASP® (Grazing Angle Surface Polarimeter) may be used. In one or more embodiments, the membrane compressive stress at the first major surface or the second major surface of the first curved glass substrate is about 6 MPa or less, about 5 MPa or less, about 4 MPa or less, or about 3 MPa or less. In one or more embodiments, the lower limit of membrane compressive stress is about 0.01 MPa or about 0.1 MPa.

In one or more embodiments, the laminate 300 may have a thickness of 6.85 mm or less, or 5.85 mm or less, where the thickness comprises the sum of thicknesses of the first curved glass substrate, the second curved glass substrate, and the interlayer. In various embodiments, the laminate may have a thickness in the range of about 1.8 mm to about 6.85 mm, or in the range of about 1.8 mm to about 5.85 mm, or in the range of about 1.8 mm to about 5.0 mm, or 2.1 mm to about 6.85 mm, or in the range of about 2.1 mm to about 5.85 mm, or in the range of about 2.1 mm to about 5.0 mm, or in the range of about 2.4 mm to about 6.85 mm, or in the range of about 2.4 mm to about 5.85 mm, or in the range of about 2.4 mm to about 5.0 mm, or in the range of about 3.4 mm to about 6.85 mm, or in the range of about 3.4 mm to about 5.85 mm, or in the range of about 3.4 mm to about 5.0 mm.

In one or more embodiments, the laminate 300 exhibits radii of curvature that is less than 1000 mm, or less than 750 mm, or less than 500 mm, or less than 300 mm. In one or more embodiments, the laminate 300 exhibits at least one radius of curvature of about 10 m or less, or about 5 m or less along at least one axis. In one or more embodiments, the laminate 300 may have a radius of curvature of 5 m or less along at least a first axis and along the second axis that is perpendicular to the first axis. In one or more embodiments, the laminate may have a radius of curvature of 5 m or less along at least a first axis and along the second axis that is not perpendicular to the first axis.

In one or more embodiments the second curved glass substrate (or the second glass substrate used to form the second curved glass substrate) is relatively thin in comparison to the first curved glass substrate (or the first glass substrate used to form the first curved glass substrate). In other words, the first curved glass substrate (or the first glass substrate used to form the first curved glass substrate) has a thickness greater than the second curved glass substrate (or the second glass substrate used to form the second curved glass substrate). In one or more embodiments, the first thickness (or the thickness of the first glass substrate used to form the first curved glass substrate) is more than two times the second thickness. In one or more embodiments, the first thickness (or the thickness of the first glass substrate used to form the first curved glass substrate) is in the range from about 1.5 times to about 10 times the second thickness (e.g., from about 1.75 times to about 10 times, from about 2 times to about 10 times, from about 2.25 times to about 10 times, from about 2.5 times to about 10 times, from about 2.75 times to about 10 times, from about 3 times to about 10 times, from about 3.25 times to about 10 times, from about 3.5 times to about 10 times, from about 3.75 times to about 10 times, from about 4 times to about 10 times, from about 1.5 times to about 9 times, from about 1.5 times to about 8 times, from about 1.5 times to about 7.5 times, from about 1.5 times to about 7 times, from about 1.5 times to about 6.5 times, from about 1.5 times to about 6 times, from about 1.5 times to about 5.5 times, from about 1.5 times to about 5 times, from about 1.5 times to about 4.5 times, from about 1.5 times to about 4 times, from about 1.5 times to about 3.5 times, from about 2 times to about 7 times, from about 2.5 times to about 6 times, from about 3 times to about 6 times).

In one or more embodiments, the first curved glass substrate (or the first glass substrate used to form the first curved glass substrate) and the second curved glass substrate (or the second glass substrate used to form the second curved glass substrate) may have the same thickness. In one or more specific embodiments, the first curved glass substrate (or the first glass substrate used to form the first curved glass substrate) is more rigid or has a greater stiffness than the second curved glass substrate (or the second glass substrate used to form the second curved glass substrate), and in very specific embodiments, both the first curved glass substrate (or the first glass substrate used to form the first curved glass substrate) and the second curved glass substrate (or the second glass substrate used to form the second curved glass substrate) have a thickness in the range of 0.2 mm and 1.6 mm.

In one or more embodiments, either one or both the first thickness (or the thickness of the first glass substrate used to form the first curved glass substrate) and the second thickness (or the thickness of the second glass substrate used to form the second curved glass substrate) is less than 1.6 mm (e.g., 1.55 mm or less, 1.5 mm or less, 1.45 mm or less, 1.4 mm or less, 1.35 mm or less, 1.3 mm or less, 1.25 mm or less, 1.2 mm or less, 1.15 mm or less, 1.1 mm or less, 1.05 mm or less, 1 mm or less, 0.95 mm or less, 0.9 mm or less, 0.85 mm or less, 0.8 mm or less, 0.75 mm or less, 0.7 mm or less, 0.65 mm or less, 0.6 mm or less, 0.55 mm or less, 0.5 mm or less, 0.45 mm or less, 0.4 mm or less, 0.35 mm or less, 0.3 mm or less, 0.25 mm or less, 0.2 mm or less, 0.15 mm or less, or about 0.1 mm or less). The lower limit of thickness may be 0.1 mm, 0.2 mm or 0.3 mm. In some embodiments, either one or both the first thickness (or the thickness of the first glass substrate used to form the first curved glass substrate) and the second thickness (or the thickness of the second glass substrate used to form the second curved glass substrate) is in the range from about 0.1 mm to less than about 1.6 mm, from about 0.1 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1 mm, from about 0.1 mm to about 0.9 mm, from about 0.1 mm to about 0.8 mm, from about 0.1 mm to about 0.7 mm, from about 0.1 mm, from about 0.2 mm to less than about 1.6 mm, from about 0.3 mm to less than about 1.6 mm, from about 0.4 mm to less than about 1.6 mm, from about 0.5 mm to less than about 1.6 mm, from about 0.6 mm to less than about 1.6 mm, from about 0.7 mm to less than about 1.6 mm, from about 0.8 mm to less than about 1.6 mm, from about 0.9 mm to less than about 1.6 mm, or from about 1 mm to about 1.6 mm.

In some embodiments, while one of the first thickness (or the thickness of the first glass substrate used to form the first curved glass substrate) and the second thickness (or the thickness of the second glass substrate used to form the second curved glass substrate) is less than about 1.6 mm, the other of the first thickness (or the thickness of the first glass substrate used to form the first curved glass substrate) and the second thickness (or the thickness of the second glass substrate used to form the second curved glass substrate) is about 1.6 mm or greater. In such embodiments, first thickness (or the thickness of the first glass substrate used to form the first curved glass substrate) and the second thickness (or the thickness of the second glass substrate used to form the second curved glass substrate) differ from one another. For example, the while one of the first thickness (or the thickness of the first glass substrate used to form the first curved glass substrate) and the second thickness (or the thickness of the second glass substrate used to form the second curved glass substrate) is less than about 1.6 mm, the other of the first thickness (or the thickness of the first glass substrate used to form the first curved glass substrate) and the second thickness (or the thickness of the second glass substrate used to form the second curved glass substrate) is about 1.7 mm or greater, about 1.75 mm or greater, about 1.8 mm or greater, about 1.7 mm or greater, about 1.7 mm or greater, about 1.7 mm or greater, about 1.85 mm or greater, about 1.9 mm or greater, about 1.95 mm or greater, about 2 mm or greater, about 2.1 mm or greater, about 2.2 mm or greater, about 2.3 mm or greater, about 2.4 mm or greater, 2.5 mm or greater, 2.6 mm or greater, 2.7 mm or greater, 2.8 mm or greater, 2.9 mm or greater, 3 mm or greater, 3.2 mm or greater, 3.4 mm or greater, 3.5 mm or greater, 3.6 mm or greater, 3.8 mm or greater, 4 mm or greater, 4.2 mm or greater, 4.4 mm or greater, 4.6 mm or greater, 4.8 mm or greater, 5 mm or greater, 5.2 mm or greater, 5.4 mm or greater, 5.6 mm or greater, 5.8 mm or greater, or 6 mm or greater. In some embodiments the first thickness (or the thickness of the first glass substrate used to form the first curved glass substrate) or the second thickness (or the thickness of the second glass substrate used to form the second curved glass substrate) is in a range from about 1.6 mm to about 6 mm, from about 1.7 mm to about 6 mm, from about 1.8 mm to about 6 mm, from about 1.9 mm to about 6 mm, from about 2 mm to about 6 mm, from about 2.1 mm to about 6 mm, from about 2.2 mm to about 6 mm, from about 2.3 mm to about 6 mm, from about 2.4 mm to about 6 mm, from about 2.5 mm to about 6 mm, from about 2.6 mm to about 6 mm, from about 2.8 mm to about 6 mm, from about 3 mm to about 6 mm, from about 3.2 mm to about 6 mm, from about 3.4 mm to about 6 mm, from about 3.6 mm to about 6 mm, from about 3.8 mm to about 6 mm, from about 4 mm to about 6 mm, from about 1.6 mm to about 5.8 mm, from about 1.6 mm to about 5.6 mm, from about 1.6 mm to about 5.5 mm, from about 1.6 mm to about 5.4 mm, from about 1.6 mm to about 5.2 mm, from about 1.6 mm to about 5 mm, from about 1.6 mm to about 4.8 mm, from about 1.6 mm to about 4.6 mm, from about 1.6 mm to about 4.4 mm, from about 1.6 mm to about 4.2 mm, from about 1.6 mm to about 4 mm, from about 3.8 mm to about 5.8 mm, from about 1.6 mm to about 3.6 mm, from about 1.6 mm to about 3.4 mm, from about 1.6 mm to about 3.2 mm, or from about 1.6 mm to about 3 mm.

In one or more specific examples, the first thickness (or the thickness of the first glass substrate used to form the first curved glass substrate) is from about 1.6 mm to about 3 mm, and the second thickness (or the thickness of the second glass substrate used to form the second curved glass substrate) is in a range from about 0.1 mm to less than about 1.6 mm.

In one or more embodiments, the laminate 300 is substantially free of visual distortion as measured by ASTM C1652/C1652M. In specific embodiments, the laminate, the first curved glass substrate and/or the second curved glass substrate are substantially free of wrinkles or distortions that can be visually detected by the naked eye, according to ASTM C1652/C1652M.

In one or more embodiments, the first major surface 312 or the second major surface 314 comprises a surface compressive stress of less than 3 MPa as measured by a surface stress meter, such as the surface stress meter commercially available under the tradename FSM-6000, from Orihara Industrial Co., Ltd. (Japan) ("FSM"). In some embodiments, the first curved glass substrate is unstrengthened as will be described herein (but may optionally be annealed), and exhibits a surface compressive stress of less than about 3 MPa, or about 2.5 MPa or less, 2 MPa or less, 1.5 MPa or less, 1 MPa or less, or about 0.5 MPa or less. In some embodiments, such surface compressive stress ranges are present on both the first major surface and the second major surface.

Figure 5:
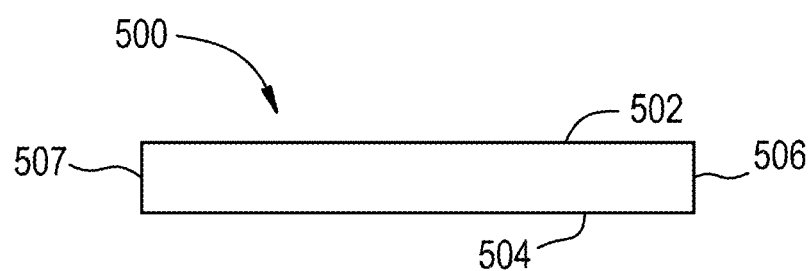
FIG. 5 is a side view of a glass substrates according to one or more embodiments.

In one or more embodiments, the first and second glass substrates used to form the first curved glass substrate and second curved substrate are provided as a substantially planar sheet 500 prior to being co-shaped to form a first curved glass substrate and second curved glass substrate, as shown in FIG. 5. The substantially planar sheets may include first and second major opposing surfaces 502, 504 and minor opposing surfaces 506, 507. In some instances, one or both of the first glass substrate and the second glass substrate used to form the first curved glass substrate and second curved substrate may have a 3D or 2.5D shape that does not exhibit the sag depth desired and will eventually be formed during the co-shaping process and present in the resulting laminate. Additionally or alternatively, the thickness of the one or both of the first curved glass substrate (or the first glass substrate used to form the first curved glass substrate) and the second curved glass substrate (or the second glass substrate used to form the second curved glass substrate) may be constant along one or more dimension or may vary along one or more of its dimensions for aesthetic and/or functional reasons. For example, the edges of one or both of the first curved glass substrate (or the first glass substrate used to form the first curved glass substrate) and the second curved glass substrate (or the second glass substrate used to form the second curved glass substrate) may be thicker as compared to more central regions of the glass substrate.

The length, width and thickness dimensions of the first curved glass substrate (or the first glass substrate used to form the first curved glass substrate) and the second curved glass substrate (or the second glass substrate used to form the second curved glass substrate) may also vary according to the article application or use. In one or more embodiments, the first curved glass substrate 310 (or the first glass substrate used to form the first curved glass substrate) includes a first length and a first width (the first thickness is orthogonal both the first length and the first width), and the second curved glass substrate 320 (or the second glass substrate used to form the second curved glass substrate) includes a second length and a second width orthogonal the second length (the second thickness is orthogonal both the second length and the second width). In one or more embodiments, either one of or both the first length and the first width is about 0.25 meters (m) or greater. For example, the first length and/or the second length may be in a range from about 1 m to about 3 m, from about 1.2 m to about 3 m, from about 1.4 m to about 3 m, from about 1.5 m to about 3 m, from about 1.6 m to about 3 m, from about 1.8 m to about 3 m, from about 2 m to about 3 m, from about 1 m to about 2.8 m, from about 1 m to about 2.8 m, from about 1 m to about 2.8 m, from about 1 m to about 2.8 m, from about 1 m to about 2.6 m, from about 1 m to about 2.5 m, from about 1 m to about 2.4 m, from about 1 m to about 2.2 m, from about 1 m to about 2 m, from about 1 m to about 1.8 m, from about 1 m to about 1.6 m, from about 1 m to about 1.5 m, from about 1.2 m to about 1.8 m or from about 1.4 m to about 1.6 m.

For example, the first width and/or the second width may be in a range from about 0.5 m to about 2 m, from about 0.6 m to about 2 m, from about 0.8 m to about 2 m, from about 1 m to about 2 m, from about 1.2 m to about 2 m, from about 1.4 m to about 2 m, from about 1.5 m to about 2 m, from about 0.5 m to about 1.8 m, from about 0.5 m to about 1.6 m, from about 0.5 m to about 1.5 m, from about 0.5 m to about 1.4 m, from about 0.5 m to about 1.2 m, from about 0.5 m to about 1 m, from about 0.5 m to about 0.8 m, from about 0.75 m to about 1.5 m, from about 0.75 m to about 1.25 m, or from about 0.8 m to about 1.2 m.

In one or more embodiments, the second length is within 5% of the first length (e.g., about 5% or less, about 4% or less, about 3% or less, or about 2% or less). For example if the first length is 1.5 m, the second length may be in a range from about 1.425 m to about 1.575 m and still be within 5% of the first length. In one or more embodiments, the second width is within 5% of the first width (e.g., about 5% or less, about 4% or less, about 3% or less, or about 2% or less). For example if the first width is 1 m, the second width may be in a range from about 1.05 m to about 0.95 m and still be within 5% of the first width.

Figure 6:
FIG. 6 is a side view of a glass substrates according to one or more embodiments.

In some embodiments, one or both of the first curved glass substrate (or the first glass substrate used to form the first curved glass substrate) and the second curved glass substrate (or the second glass substrate used to form the second curved glass substrate) 500A may have a wedged shape in which the thickness at one minor surface 506A is greater than the thickness at an opposing minor surface 507A, as illustrated in FIG. 6. Where the thickness varies, the thickness ranges disclosed herein are the maximum thickness between the major surfaces.

In one or more embodiments, the first curved glass substrate (or the first glass substrate used to form the first curved glass substrate) and the second curved glass substrate (or the second glass substrate used to form the second curved glass substrate) may have a refractive index in the range from about 1.2 to about 1.8, from about 1.2 to about 1.75, from about 1.2 to about 1.7, from about 1.2 to about 1.65, from about 1.2 to about 1.6, from about 1.2 to about 1.55, from about 1.25 to about 1.8, from about 1.3 to about 1.8, from about 1.35 to about 1.8, from about 1.4 to about 1.8, from about 1.45 to about 1.8, from about 1.5 to about 1.8, from about 1.55 to about 1.8, of from about 1.45 to about 1.55. As used herein, the refractive index values are with respect to a wavelength of 550 nm.

In one or more embodiments, the first curved glass substrate (or the first glass substrate used to form the first curved glass substrate) and the second curved glass substrate (or the second glass substrate used to form the second curved glass substrate) may be characterized by the manner in which it is formed. For instance, one of or both the first curved glass substrate (or the first glass substrate used to form the first curved glass substrate) and the second curved glass substrate (or the second glass substrate used to form the second curved glass substrate) may be characterized as float-formable (i.e., formed by a float process), down-drawable and, in particular, fusion-formable or slot-drawable (i.e., formed by a down draw process such as a fusion draw process or a slot draw process).

One of or both the first curved glass substrate (or the first glass substrate used to form the first curved glass substrate) and the second curved glass substrate (or the second glass substrate used to form the second curved glass substrate) described herein may be formed by a float process. A float-formable glass substrate may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass substrate that can be lifted from the tin onto rollers. Once off the bath, the glass substrate can be cooled further and annealed to reduce internal stress.

One of or both the first curved glass substrate (or the first glass substrate used to form the first curved glass substrate) and the second curved glass substrate (or the second glass substrate used to form the second curved glass substrate) may be formed by a down-draw process. Down-draw processes produce glass substrates having a substantially uniform thickness that possess relatively pristine surfaces. Because the average flexural strength of the glass substrates is generally controlled by the amount and size of surface flaws, a pristine surface that has had minimal contact has a higher initial strength. In addition, down drawn glass substrates have a very flat, smooth surface that can be used in its final application without costly grinding and polishing.

One of or both the first curved glass substrate (or the first glass substrate used to form the first curved glass substrate) and the second curved glass substrate (or the second glass substrate used to form the second curved glass substrate) may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass substrate. The fusion draw method offers the advantage that, because the two glass films flowing over the channel fuse together, neither of the outside surfaces of the resulting glass substrate comes in contact with any part of the apparatus. Thus, the surface properties of the fusion drawn glass substrate are not affected by such contact.

One of or both the first curved glass substrate (or the first glass substrate used to form the first curved glass substrate) and the second curved glass substrate (or the second glass substrate used to form the second curved glass substrate) described herein may be formed by a slot draw process. The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous glass substrate and into an annealing region.

In one or more embodiments, one of or both the first curved glass substrate (or the first glass substrate used to form the first curved glass substrate) and the second curved glass substrate (or the second glass substrate used to form the second curved glass substrate) and second substrate may be glass (e.g., soda lime glass, alkali aluminosilicate glass, alkali containing borosilicate glass and/or alkali aluminoborosilicate glass) or glass-ceramic. In some embodiments, one of or both the first curved glass substrate (or the first glass substrate used to form the first curved glass substrate) and the second curved glass substrate (or the second glass substrate used to form the second curved glass substrate) described herein may exhibit an amorphous microstructure and may be substantially free of crystals or crystallites. In other words, the glass substrates of certain embodiments exclude glass-ceramic materials. In some embodiments, one of or both the first curved glass substrate (or the first glass substrate used to form the first curved glass substrate) and the second curved glass substrate (or the second glass substrate used to form the second curved glass substrate) is a glass-ceramic. Examples of suitable glass-ceramics include $Li_2O$—$Al_2O_3$—$SiO_2$ system (i.e. LAS-System) glass-ceramics, $MgO$—$Al_2O_3$—$SiO_2$ system (i.e. MAS-System) glass-ceramics, and glass-ceramics including crystalline phases of any one or more of mullite, spinel, α-quartz, β-quartz solid solution, petalite, lithium disilicate, β-spodumene, nepheline, and alumina. Such substrates including glass-ceramic materials may be strengthened as described herein.

In one or more embodiments, one of or both the first curved glass substrate (or the first glass substrate used to form the first curved glass substrate) and the second curved glass substrate (or the second glass substrate used to form the second curved glass substrate) exhibits a total solar transmittance of about 92% or less, over a wavelength range from about 300 nm to about 2500 nm, when the glass substrate has a thickness of 0.7 mm. For example, the one of or both the first and second glass substrates exhibits a total solar transmittance in a range from about 60% to about 92%, from about 62% to about 92%, from about 64% to about 92%, from about 65% to about 92%, from about 66% to about 92%, from about 68% to about 92%, from about 70% to about 92%, from about 72% to about 92%, from about 60% to about 90%, from about 60% to about 88%, from about 60% to about 86%, from about 60% to about 85%, from about 60% to about 84%, from about 60% to about 82%, from about 60% to about 80%, from about 60% to about 78%, from about 60% to about 76%, from about 60% to about 75%, from about 60% to about 74%, or from about 60% to about 72%.

In one or more embodiments, one or both the first curved glass substrate (or the first glass substrate used to form the first curved glass substrate) and the second curved glass substrate (or the second glass substrate used to form the second curved glass substrate) are tinted. In such embodiments, the first curved glass substrate (or the first glass substrate used to form the first curved glass substrate) may comprise a first tint and the second curved glass substrate (or the second glass substrate used to form the second curved glass substrate) comprises a second tint that differs from the first tint, in the CIE L*a*b* (CIELAB) color space. In one or more embodiments, the first tint and the second tint are the same. In one or more specific embodiments, the first curved glass substrate comprises a first tint, and the second curved glass substrate is not tinted. In one or more specific embodiments, the second curved glass substrate comprises a second tint, and the first curved glass substrate is not tinted.

In one or embodiments, the one of or both the first curved glass substrate (or the first glass substrate used to form the first curved glass substrate) and the second curved glass substrate (or the second glass substrate used to form the second curved glass substrate) exhibits an average transmittance in the range from about 75% to about 85%, at a thickness of 0.7 mm or 1 mm, over a wavelength range from about 380 nm to about 780 nm. In some embodiments, the average transmittance at this thickness and over this wavelength range may be in a range from about 75% to about 84%, from about 75% to about 83%, from about 75% to about 82%, from about 75% to about 81%, from about 75% to about 80%, from about 76% to about 85%, from about 77% to about 85%, from about 78% to about 85%, from about 79% to about 85%, or from about 80% to about 85%. In one or more embodiments, the one of or both the first curved glass substrate (or the first glass substrate used to form the first curved glass substrate) and the second curved glass substrate (or the second glass substrate used to form the second curved glass substrate) exhibits $T_{uv-380}$ or $T_{uv-400}$ of 50% or less (e.g., 49% or less, 48% or less, 45% or less, 40% or less, 30% or less, 25% or less, 23% or less, 20% or less, or 15% or less), at a thickness of 0.7 mm or 1 mm, over a wavelength range from about 300 nm to about 400 nm.

In one or more embodiments, the one of or both the first curved glass substrate (or the first glass substrate used to form the first curved glass substrate) and the second curved glass substrate (or the second glass substrate used to form the second curved glass substrate) may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments, such strengthened glass substrates may be chemically strengthened, mechanically strengthened or thermally strengthened. In some embodiments, the strengthened glass substrate may be chemically and mechanically strengthened, mechanically and thermally strengthened, chemically and thermally strengthened or chemically, mechanically and thermally strengthened. In one or more specific embodiments, the second curved glass substrate (or the second glass substrate used to form the second curved glass substrate) is strengthened and the first curved glass substrate (or the first glass substrate used to form the first curved glass substrate) is unstrengthened but optionally annealed. In one or more embodiments, the first curved glass substrate (or the first glass substrate used to form the first curved glass substrate) is strengthened. In specific embodiments, both the first curved glass substrate (or the first glass substrate used to form the first curved glass substrate) and the second curved glass substrate (or the second glass substrate used to form the second curved glass substrate) are strengthened. In one or more embodiments, where one or both the glass substrates are chemically and/or thermally strengthened, such chemical and/or thermal strengthening is performed on the curved glass substrate (i.e., after shaping). In some embodiments, such glass substrates may be optionally mechanically strengthened before shaping. In one or more embodiments, where one or both the glass substrates are mechanically strengthened (and optionally combined with one or more other strengthening methods), such mechanical strengthening occurs before shaping.

In one or more embodiments, the one of or both the first curved glass substrate (or the first glass substrate used to form the first curved glass substrate) and the second curved glass substrate (or the second glass substrate used to form the second curved glass substrate) may be strengthened mechanically by utilizing a mismatch of the coefficient of thermal expansion between portions of the article to create a compressive stress region and a central region exhibiting a tensile stress. The DOC in such mechanically strengthened substrates is typically the thickness of the outer portions of the glass substrate having one coefficient of thermal expansion (i.e., the point at which the glass substrate coefficient of thermal expansion changes from one to another value).

In some embodiments, the one of or both the first curved glass substrate (or the first glass substrate used to form the first curved glass substrate) and the second curved glass substrate (or the second glass substrate used to form the second curved glass substrate) may be strengthened thermally by heating the glass substrate to a temperature below the glass transition point and then rapidly thermally quenching, or lowering its temperature. As noted above, in one or more embodiments, where one or both the glass substrates are thermally strengthened, such thermal strengthening is performed on the curved glass substrate (i.e., after shaping).

In one or more embodiments, the one of or both the first curved glass substrate (or the first glass substrate used to form the first curved glass substrate) and the second curved glass substrate (or the second glass substrate used to form the second curved glass substrate) may be chemically strengthening by ion exchange. As noted above, in one or more embodiments, where one or both the glass substrates are chemically strengthened, such chemical strengthening is performed on the curved glass substrate (i.e., after shaping). In the ion exchange process, ions at or near the surface of the glass substrate are replaced by—or exchanged with—larger ions having the same valence or oxidation state. In those embodiments in which the glass substrate comprises a composition including at least one alkali metal oxide as measured on an oxide basis (e.g., $Li_2O$, $Na_2O$, $K_2O$, $Rb_2O$, or $Cs_2O$), ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass substrate generate a compressive stress on the surface portions, balanced by a tensile stress in the central portions.

Ion exchange processes are typically carried out by immersing a glass substrate in a molten salt bath (or two or more molten salt baths) containing the larger ions to be exchanged with the smaller ions in the glass substrate. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass substrate in a salt bath (or baths), use of multiple salt baths, additional steps such as annealing, washing, and the like, are generally determined by the composition of the glass substrate (including the structure of the article and any crystalline phases present) and the desired DOC and CS of the glass substrate that results from strengthening. Exemplary molten bath composition may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass substrate thickness, bath temperature and glass (or monovalent ion) diffusivity. However, temperatures and immersion times different from those described above may also be used.

In one or more embodiments, the glass substrate may be immersed in a molten salt bath of 100% $NaNO_3$, 100% $KNO_3$, or a combination of $NaNO_3$ and $KNO_3$ having a temperature from about 370° C. to about 480° C. In some embodiments, the glass substrate may be immersed in a molten mixed salt bath including from about 5% to about 90% $KNO_3$ and from about 10% to about 95% $NaNO_3$. In one or more embodiments, the glass substrate may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass substrate may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass substrate. The spike may result in a greater surface CS value. This spike can be achieved by single bath or multiple baths, with the bath(s) having a single composition or mixed composition, due to the unique properties of the glass compositions used in the glass substrates described herein.

In one or more embodiments, where more than one monovalent ion is exchanged into the glass substrate, the different monovalent ions may exchange to different depths within the glass substrate (and generate different magnitude stresses within the glass substrate at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass substrate. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass substrate is chemically strengthened by an ion exchange treatment, FSM or SCALP may be used depending on which ion is exchanged into the glass substrate. Where the stress in the glass substrate is generated by exchanging potassium ions into the glass substrate, FSM is used to measure DOC. Where the stress is generated by exchanging sodium ions into the glass substrate, SCALP is used to measure DOC. Where the stress in the glass substrate is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by FSM. Central tension or CT is the maximum tensile stress and is measured by SCALP.

In one or more embodiments, the first curved glass substrate (or the first glass substrate used to form the first curved glass substrate) and the second curved glass substrate (or the second glass substrate used to form the second curved glass substrate) may be strengthened to exhibit a DOC that is described a fraction of the thickness t of the glass substrate (as described herein). For example, in one or more embodiments, the DOC may be equal to or greater than about 0.03t, equal to or greater than about 0.035t, equal to or greater than about 0.04t, equal to or greater than about 0.045t, equal to or greater than about 0.05t, equal to or greater than about 0.1t, equal to or greater than about 0.11t, equal to or greater than about 0.12t, equal to or greater than about 0.13t, equal to or greater than about 0.14t, equal to or greater than about 0.15t, equal to or greater than about 0.16t, equal to or greater than about 0.17t, equal to or greater than about 0.18t, equal to or greater than about 0.19t, equal to or greater than about 0.2t, equal to or greater than about 0.21t. In some embodiments, the DOC may be in a range from about 0.03t to about 0.25t, from about 0.04t to about 0.25 t, from about 0.05t to about 0.25 t, from about 0.06t to about 0.25 t, from about 0.07t to about 0.25 t, from about 0.08t to about 0.25t, from about 0.09t to about 0.25t, from about 0.18t to about 0.25t, from about 0.11t to about 0.25t, from about 0.12t to about 0.25t, from about 0.13t to about 0.25t, from about 0.14t to about 0.25t, from about 0.15t to about 0.25t, from about 0.08t to about 0.24t, from about 0.08t to about 0.23t, from about 0.08t to about 0.22t, from about 0.08t to about 0.21t, from about 0.08t to about 0.2t, from about 0.08t to about 0.19t, from about 0.08t to about 0.18t, from about 0.08t to about 0.17t, from about 0.08t to about 0.16t, or from about 0.08t to about 0.15t. In some instances, the DOC may be about 20 μm or less. In one or more embodiments, the DOC may be about 40 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 µm to about 100 µm.

In one or more embodiments, the strengthened glass substrate may have a CS (which may be found at the surface or a depth within the glass substrate) of about 100 MPa or greater, about 150 MPa or greater, about 200 MPa or greater, about 300 MPa or greater, about 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass substrate may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa.

In one or more embodiments, the first curved glass substrate (or the first glass substrate used to form the first curved glass substrate) and the second curved glass substrate (or the second glass substrate used to form the second curved glass substrate) comprise one of soda lime silicate glass, an alkali aluminosilicate glass, alkali containing borosilicate glass, alkali aluminophosphosilicate glass, or alkali aluminoborosilicate glass. In one or more embodiments, one of the first curved glass substrate (or the first glass substrate used to form the first curved glass substrate) and the second curved glass substrate (or the second glass substrate used to form the second curved glass substrate) is a soda lime silicate glass, while the other of the first curved glass substrate (or the first glass substrate used to form the first curved glass substrate) and the second curved glass substrate (or the second glass substrate used to form the second curved glass substrate) is an alkali aluminosilicate glass, alkali containing borosilicate glass, alkali aluminophosphosilicate glass, or alkali aluminoborosilicate glass.

In one or more embodiments, the interlayer used herein (e.g., 330) may include a single layer or multiple layers. The interlayer (or layers thereof) may be formed polymers such as polyvinyl butyral (PVB), acoustic PBV (APVB), ionomers, ethylene-vinyl acetate (EVA) and thermoplastic polyurethane (TPU), polyester (PE), polyethylene terephthalate (PET) and the like. The thickness of the interlayer may be in the range from about 0.5 mm to about 2.5 mm, from about 0.8 mm to about 2.5 mm, from about 1 mm to about 2.5 mm or from about 1.5 mm to about 2.5 mm. The interlayer may also have a non-uniform thickness, or wedge shape, from one edge to the other edge of the laminate.

In one or more embodiments, the laminate (and/or one of or both the first curved glass substrate and the second curved glass substrate) exhibits a complexly curved shape. As used herein "complex curve" and "complexly curved" mean a non-planar shape having curvature along two orthogonal axes that are different from one another. Examples of complexly curved shapes includes having simple or compound curves, also referred to as non-developable shapes, which include but are not limited to spherical, aspherical, and toroidal. The complexly curved laminates according to embodiments may also include segments or portions of such surfaces, or be comprised of a combination of such curves and surfaces. In one or more embodiments, a laminate may have a compound curve including a major radius and a cross curvature. A complexly curved laminate according to one or more embodiments may have a distinct radius of curvature in two independent directions. According to one or more embodiments, complexly curved laminates may thus be characterized as having "cross curvature," where the laminate is curved along an axis (i.e., a first axis) that is parallel to a given dimension and also curved along an axis (i.e., a second axis) that is perpendicular to the same dimension. The curvature of the laminate can be even more complex when a significant minimum radius is combined with a significant cross curvature, and/or depth of bend. Some laminates may also include bending along axes that are not perpendicular to one another. As a non-limiting example, the complexly-curved laminate may have length and width dimensions of 0.5 m by 1.0 m and a radius of curvature of 2 to 2.5 m along the minor axis, and a radius of curvature of 4 to 5 m along the major axis. In one or more embodiments, the complexly-curved laminate may have a radius of curvature of 5 m or less along at least one axis. In one or more embodiments, the complexly-curved laminate may have a radius of curvature of 5 m or less along at least a first axis and along the second axis that is perpendicular to the first axis. In one or more embodiments, the complexly-curved laminate may have a radius of curvature of 5 m or less along at least a first axis and along the second axis that is not perpendicular to the first axis.

The laminate of any one of the preceding claims, wherein the laminate comprises automotive glazing or architectural glazing.

Figure 7:
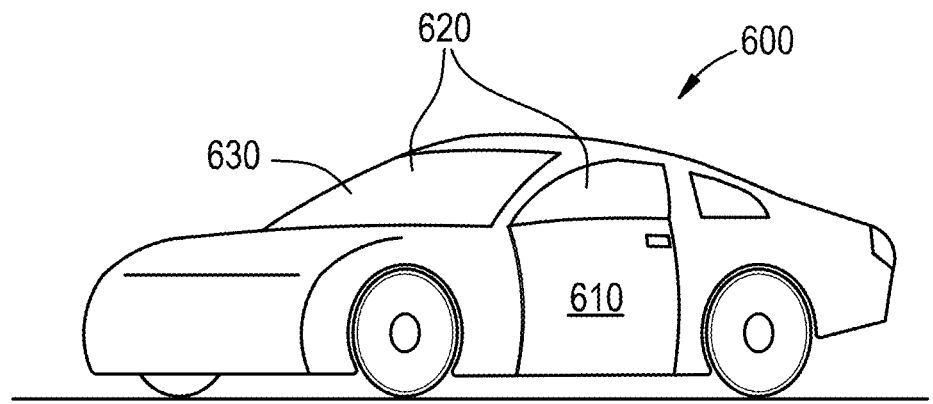
FIG. 7 is a perspective view of a vehicle according to one or more embodiments.

A second aspect of this disclosure pertains to a vehicle that includes a laminate according to one or more embodiments described herein. For example, as shown in FIG. 7 shows a vehicle 600 comprising a body 610 defining an interior, at least one opening 620 in communication with the interior, and a glazing disposed in the opening, wherein the window comprises a laminate 630, according to one or more embodiments described herein. In one or more embodiments, the laminate is complexly curved. The laminate 630 may form the sidelights, windshields, rear windows, rearview mirrors, and sunroofs in the vehicle. In some embodiments, the laminate 630 may form an interior partition (not shown) within the interior of the vehicle, or may be disposed on an exterior surface of the vehicle and form an engine block cover, headlight cover, taillight cover, or pillar cover. In one or more embodiments, the vehicle may include an interior surface (not shown, but may include door trim, seat backs, door panels, dashboards, center consoles, floor boards, and pillars), and the laminate or glass article described herein is disposed on the interior surface. In one or more embodiment, the interior surface includes a display and the glass layer is disposed over the display. As used herein, vehicle includes automobiles, motorcycles, rolling stock, locomotive, boats, ships, airplanes, helicopters, drones, space craft and the like.

Another aspect of this disclosure pertains to an architectural application that includes the laminates described herein. In some embodiments, the architectural application includes balustrades, stairs, decorative panels or covering for walls, columns, partitions, elevator cabs, household appliances, windows, furniture, and other applications, formed at least partially using a laminate or glass article according to one or more embodiments.

In one or more embodiments, the laminate is positioned within a vehicle or architectural application such that the second curved glass substrate faces the interior of the vehicle or the interior of a building or room, such that the second curved glass substrate is adjacent to the interior (and the first curved glass substrate is adjacent the exterior). In some embodiments, the second curved glass substrate is in direct contact with the interior (i.e., the fourth surface 324 of the second curved glass substrate glass article facing the interior is bare and is free of any coatings). In one or more embodiments, the first surface 312 of the first curved glass substrate is bare and is free of any coatings. In one or more embodiments, the laminate is positioned within a vehicle or architectural application such that the second curved glass substrate faces the exterior of the vehicle or the exterior of a building or room, such that the second first curved glass substrate is adjacent to the exterior (and the first curved glass substrate is adjacent the interior). In some embodiments, the second curved glass substrate of the laminate is in direct contact with the exterior (i.e., the surface of the second curved glass substrate facing the exterior is bare and is free of any coatings).

In one or more embodiments, referring to FIG. 3, both the first surface 312 and the fourth surface 324 is bare and substantially free of any coatings. In some embodiment one or both the edge portions of the first surface 312 and the fourth surface 324 may include a coating while the central portions are bare and substantially free of any coatings. Optionally, one or both the first surface 312 and the fourth surface 324 includes a coating or surface treatment (e.g., antireflective coating, anti-glare coating or surface, easy-to-clean surface, ink decoration, conductive coatings etc.). In one or more embodiments, the laminate includes one or more conductive coatings on one of or both the second surface 312 or the third surface 322 adjacent the interlayer 330.

In one or more embodiments, referring to FIG. 3A, both the first surface 322 and the fourth surface 314 is bare and substantially free of any coatings. In some embodiment one or both the edge portions of the first surface 322 and the fourth surface 314 may include a coating while the central portions are bare and substantially free of any coatings. Optionally, one or both the first surface 322 and the fourth surface 314 includes a coating or surface treatment (e.g., antireflective coating, anti-glare coating or surface, easy-to-clean surface, ink decoration, conductive coatings etc.). In one or more embodiments, the laminate includes one or more conductive coatings on one of or both the second surface 324 or the third surface 312 adjacent the interlayer 330.

A third aspect of this disclosure pertains to a method of forming a curved laminate, such as the embodiments of the curved laminates described herein. In one or more embodiments, the method includes forming a stack comprising a first glass substrate according to one or more embodiments, and a second glass substrate according to one or more embodiments, and heating the stack and co-shaping the stack to form a co-shaped stack. In one or more embodiments, the second glass substrate is disposed on the first glass substrate to form the stack. In one or more embodiments, the first glass substrate is disposed on the second glass substrate to form the stack.

Figure 8:
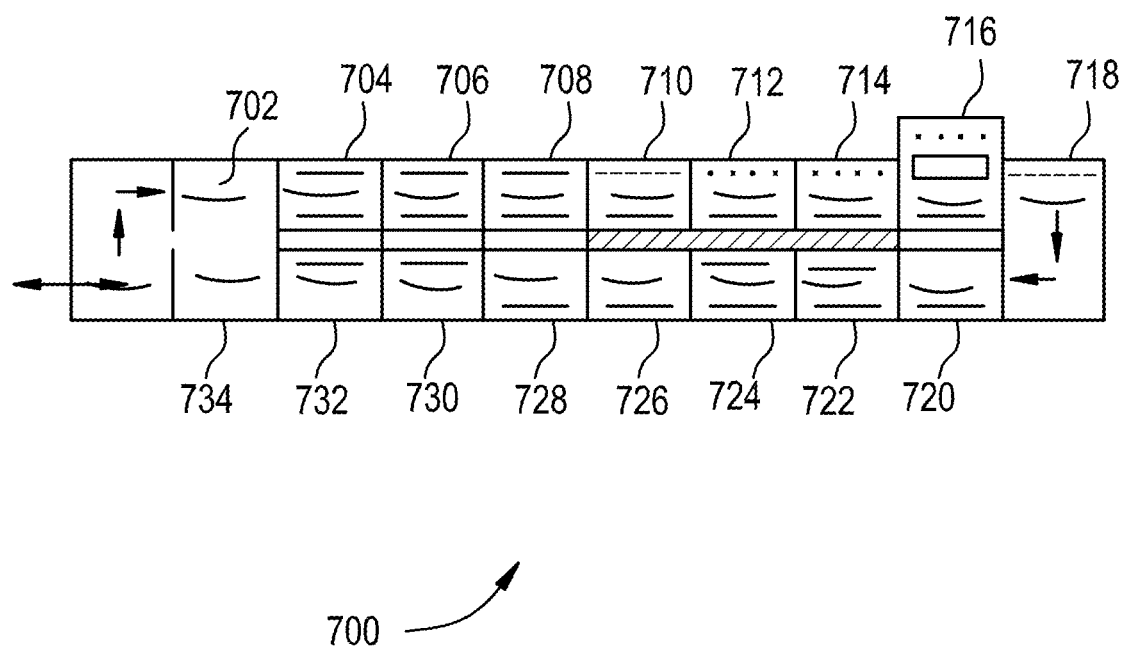
FIG. 8 is a side cross-sectional view of a lehr furnace that can be used in a method according to one or more embodiments of a method for forming a curved laminate.

Heating the stack may include placing the stack in a dynamic furnace such as a lehr furnace or a static furnace. An example of a lehr furnace 700 is shown in FIG. 8. In a dynamic furnace such as a lehr furnace, the stack is introduced in a first module 702 and then conveyed through a series of modules 702, 704, 706, 708, 710, 712, having sequentially increasing temperatures until reaching a maximum temperature in module 714. This maximum temperature is referred to as the set point of the furnace. In module 716, the stack is co-shaped. In some embodiments, heat is applied in module 716, but may not be required. The stack is then conveyed through module 718 to a series of modules 720, 722, 724, 726, 728, 730, 732 with sequentially decreasing temperature that permit gradual cooling of the stack until it reaches module 734. The duration of time for which the stack is present in each module is also specified (e.g., in a range from about 30 seconds to 500 seconds). In one or more embodiments, module 704 is controlled to have a temperature in a range from about 225° C. to about 275° C., module 706 is controlled to have a temperature in a range from about 400° C. to about 460° C., module 708 is controlled to have a temperature in a range from about 530° C. to about 590° C., module 710 is controlled to have a temperature in a range from about 580° C. to about 640° C., module 712 is controlled to have a temperature in a range from about 590° C. to about 650° C., and module 714 is controlled to have a temperature in a range from about 600° C. to about 680° C. In typical furnaces, the temperature of the glass substrates is less than the temperature at which the module is controlled. For example, the difference between the glass substrate temperature and the controlled module temperature may be in a range from about 10° C. to 20° C.

In one or more embodiments, the stack comprises opposing major surfaces each comprising a central portion and an edge portion surrounding the central portion. In one or more embodiments, the co-shaped stack includes a first curved glass substrate having a first sag depth and a second curved glass substrate each having a second sag depth, wherein the first sag depth and the second sag depth are greater than 2 mm and within 10% of one another.

In one or more embodiments, the first glass substrate (prior to heating and co-shaping) includes a first viscosity (poises) and a first sag temperature and the second glass substrate includes a second viscosity that greater than or equal to 10 times the first viscosity and a second sag temperature that differs from the first sag temperature by about 30° C. or more (e.g., 35° C. or more, 40° C. or more, 45° C. or more, 50° C. or more, 55° C. or more, or 60° C. or more).

In one or more embodiments, heating the stack comprises heating the stack to a temperature different from the first sag temperature and the second sag temperature. In some embodiments, heating the stack comprises heating the stack to a temperature between the first sag temperature and the second sag temperature (e.g., from about 630° C. to about 665° C., from about 630° C. to about 660° C., from about 630° C. to about 655° C., from about 630° C. to about 650° C., from about 630° C. to about 645° C., from about 635° C. to about 665° C., from about 640° C. to about 665° C., from about 645° C. to about 665° C., or from about 650° C. to about 665° C.). In one or more specific embodiments, heating the stack comprises heating the stack to the first sag temperature or to the second sag temperature.

In one or more embodiments of the method, the first sag depth and/or the second sag depth is in a range from about 6 mm to about 25 mm. For example, one or both the first sag depth and the second sag depth may be in a range from about 2 mm to about 25 mm, from about 4 mm to about 25 mm, from about 5 mm to about 25 mm, from about 6 mm to about 25 mm, from about 8 mm to about 25 mm, from about 10 mm to about 25 mm, from about 12 mm to about 25 mm, from about 14 mm to about 25 mm, from about 15 mm to about 25 mm, from about 2 mm to about 24 mm, from about 2 mm to about 22 mm, from about 2 mm to about 20 mm, from about 2 mm to about 18 mm, from about 2 mm to about 16 mm, from about 2 mm to about 15 mm, from about 2 mm to about 14 mm, from about 2 mm to about 12 mm, from about 2 mm to about 10 mm, from about 2 mm to about 8 mm, from about 6 mm to about 20 mm, from about 8 mm to about 18 mm, from about 10 mm to about 15 mm, from about 12 mm to about 22 mm, from about 15 mm to about 25 mm, or from about 18 mm to about 22 mm.

In one or more embodiments, the method includes positioning or placing the stack on a female mold and heating the stack as it is positioned on the female mold. In some embodiments, co-shaping the stack includes sagging the stack using gravity through an opening in the female mold. As used herein, term such as "sag depth" refer to shaping depth achieved by sagging or other co-shaping process.

In one or more embodiments, the method includes applying a male mold to the stack. In some embodiments, the male mold is applied while the stack is positioned or placed on a female mold.

In one or more embodiments, the method includes applying a vacuum to the stack to facilitate co-shaping the stack. In some embodiments, the vacuum is applied while the stack is positioned or placed on a female mold.

In one or more embodiments, the method includes heating the stack at a constant temperature while varying the duration of heating until the co-shaped stack is formed. As used herein, constant temperature means a temperature that is ±3° C. from a target temperature, ±2° C. from a target temperature, or ±1° C. from a target temperature.

In one or more embodiments, the method includes heating the stack for a constant duration, while varying the temperature of heating until the co-shaped stack is formed. As used herein, constant duration means a duration that is ±10 seconds from a target duration, ±7 seconds from a target duration, ±5 seconds from a target duration, or ±3 seconds from a target duration.

In one or more embodiments, the method includes co-shaping the stack by heating the stack at a constant temperature (as defined herein) during co-shaping. In one or more embodiments, the method includes co-shaping the stack by heating the stack at a constantly increasing temperature during co-shaping. As used herein, the term constantly increasing may include a linearly increasing temperature or a temperature that increases stepwise in regular or irregular intervals.

In one or more embodiments, the method includes generating a temperature gradient in the stack between the central portion and the edge portion of the stack. In some instances, generating a temperature gradient comprises applying heat unevenly to the central portion and the edge portion. In some embodiments, more heat is applied to the central portion than is applied to the edge portion. In other embodiments, more heat is applied to the edge portion than is applied to the central portion. In some embodiments, generating a temperature gradient comprises reducing the heat applied to one of the central portion and the edge portion compared to heat applied to the other of the central portion and the edge portion. In some instances, generating a temperature gradient comprises reducing the heat applied to the central portion compared to the heat applied to the edge portion. In some embodiments, generating a temperature includes reducing the heat applied to the edge portion compared to the heat applied to the central portion. Heat may be reduced to the central portion or edge portion by physical means such as by shielding such portions with a physical barrier or thermal barrier or adding a heat sink to such portions.

In one or more embodiments, the method includes generating an attractive force between the first glass substrate and the second glass substrate. The method includes generating the attractive force while heating the stack and/or while co-shaping the stack. In some embodiments, generating the attractive force includes generating an electrostatic force.

In one or more embodiments, the method includes generating a vacuum between the first glass substrate and the second glass substrate. The method includes generating the vacuum while heating the stack and/or while co-shaping the stack. In some embodiments, generating the vacuum includes heating both the stack whereby one of the first glass substrate and the second substrate (whichever is positioned below the other in the stack) begins to curve before the other of the first glass substrate and the second glass substrate. This curving of one of the first glass substrate and the second glass substrate creates a vacuum between the first glass substrate and the second glass substrate. This vacuum causes the glass substrate that does not curve first (i.e., the glass substrate that does not curve while the other glass substrate begins to sag) to begin to curve with the other glass substrate. In one or more embodiments, the method includes creating and maintaining contact between the respective peripheral portions (315, 325) of the first glass substrate and the second substrate to generate and/or maintain the vacuum between the glass substrates. In one or more embodiments, the contact is maintained along the entire peripheral portions (315, 325). In one or more embodiments, the contact is maintained until the sag depth is achieved in one or both of the first glass substrate and the second glass substrate.

In one or more embodiments, the method includes forming a temporary bond between the first glass substrate and the second glass substrate. In some embodiments, the temporary bond may include an electrostatic force or may include a vacuum force (which may be characterized as an air film between glass substrates). The method includes forming the temporary bond while heating the stack and/or while co-shaping the stack. As used herein, the phrase "temporary bond" refers to a bond that can be overcome by hand or using equipment known in the art for separating co-shaped glass substrates (which do not include an interlayer therebetween).

To evaluate and characterize the mechanism for the temporary bond, the first glass substrate and the second glass substrate were stacked together, with a layer of separation powder (e.g., CaCO3, talc, etc.) disposed between the first glass substrate and the second glass substrate. The viscosity at 630° C. of the second glass substrate is greater than the viscosity at 630° C. of the first glass substrate, and the second glass substrate is positioned on top of the first glass substrate. To mathematically characterize the formation of a temporary bond, it was assumed that an air film (or gap having a distance) exists between the first glass substrate and the second glass substrate that is approximately equal to the largest diameter of the separation powder particles (e.g., in a range from about 10 micrometers to about 20 micrometers). Pressure (P) in the gap within the assumed air film between two glass substrates is governed by Equation 1 below:

$$\frac{\partial h}{\partial t} = \nabla\left(\frac{h^3}{12\mu}\nabla P\right) \quad [1]$$

where, h is the gap between first glass substrate and the second glass substrate as a function of time t and μ is the air viscosity. This equation relates pressure to gap opening and is valid as long as the gap, h, is minimized or relatively small compared to the maximum thickness of the glass substrates (e.g., the gap to maximum glass substrate thickness ratio is less than about 10% or less than about 5%). If the glass substrates are in an elastic state (before being heated or pre-heated), there is no change in the gap distance between the two glass substrates. When the glass substrates are heated to forming temperatures and when the viscosity of bottom glass substrate is sufficiently low, the second glass substrate (positioned under the first glass substrate) will tend to curve away (or sag away, in the case where co-shaping includes co-sagging) from first glass substrate; however for separation to occur, air must enter between glass substrates from the edges, which creates lower pressure (vacuum or suction) between the two glass substrates that will prevent the second glass substrate from curving away or separating from the first glass substrate.

Figure 9:
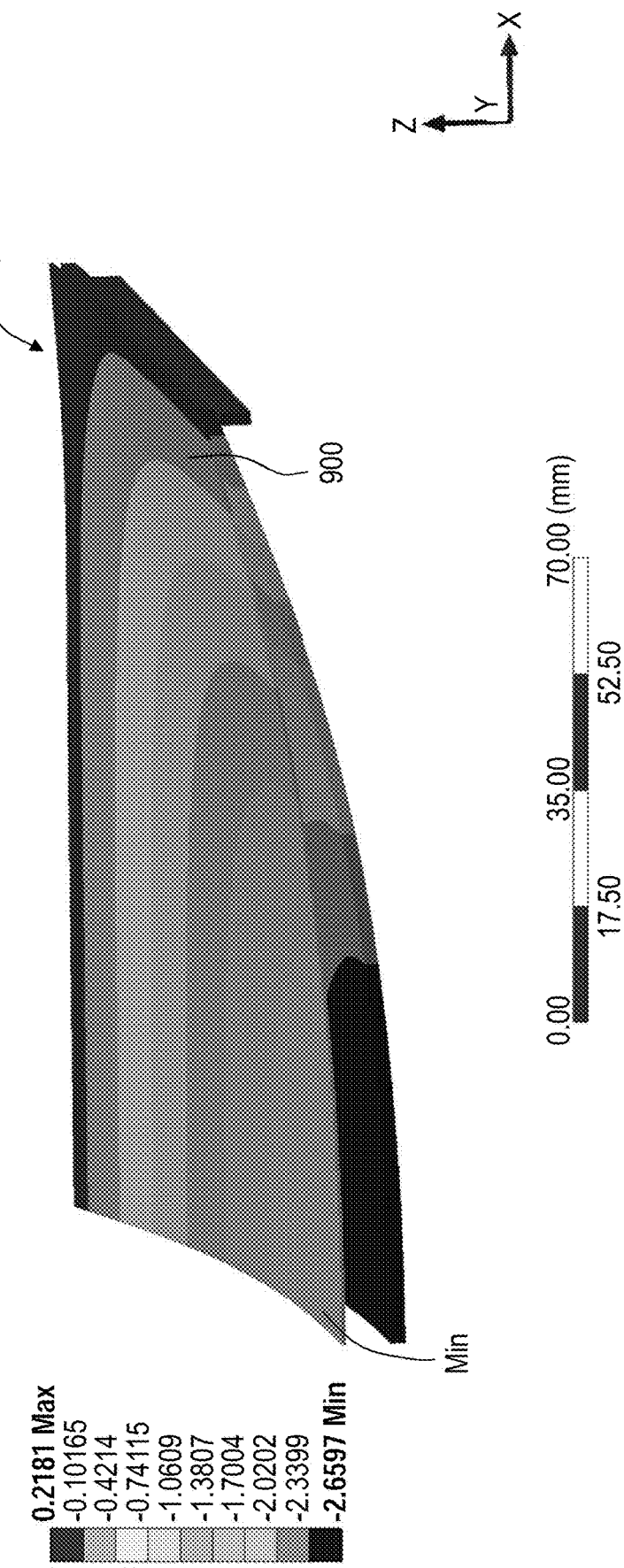
FIG. 9 is an illustration of a co-shaping simulation of two glass substrates, with air flow effects.

Formation of a temporary bond caused by a suction or vacuum force between the glass substrates was verified through simulation. FIG. 9 shows a simulation of co-shaping two glass substrates having differing viscosity at 630° C., with air flow effects.

In the simulation, the first glass substrate has a thickness of 2.1 mm and is a soda lime silicate glass substrate that is positioned underneath the second glass substrate, which has a thickness of 0.55 mm and is an aluminosilicate glass substrate. The aluminosilicate glass substrate includes a composition of 67 mol % SiO2, 8.52 mol % Al2O3, 14 mol % Na2O, 1.2 mol % K2O, 6.5 mol % MgO, 0.5 mol % CaO, and 0.2 mol % SnO2. The simulation included a steel frame 900 having a thickness of 2 mm that supported the first and second glass substrate stack around their periphery. The frame had a length and width of 298 mm. Both the first and second glass substrates had a length and width of 300 mm. The initial gap between first and second glass substrates was 25 μm. FIG. 9 shows one-quarter (¼) of the complete image of the first and second glass substrates after the simulation.

Figure 10:
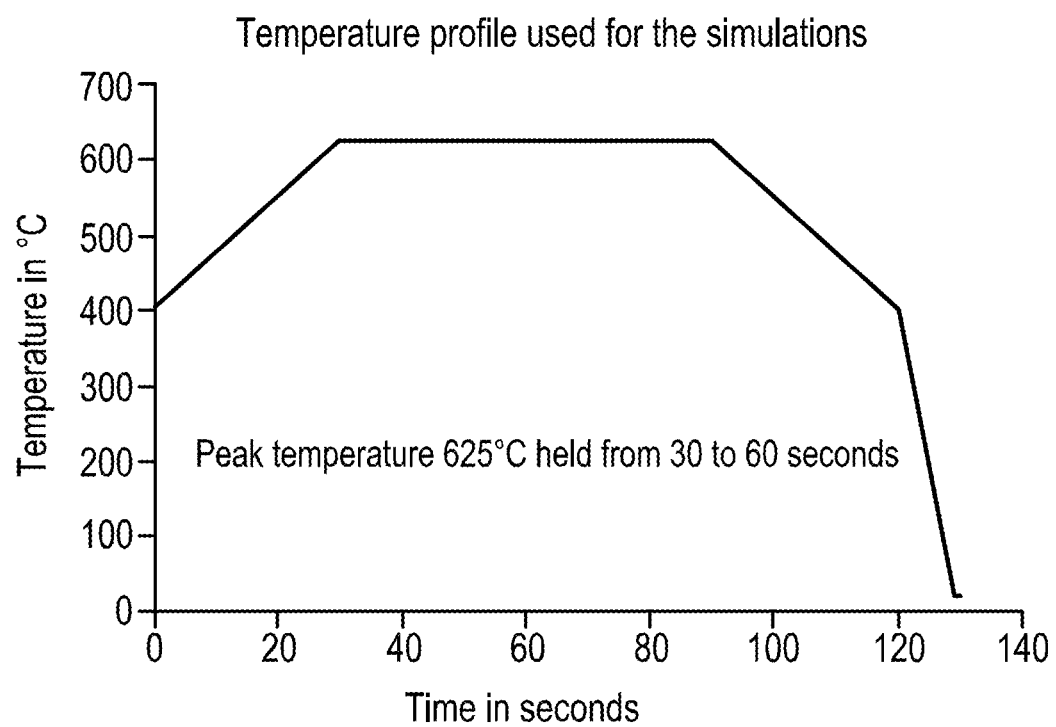
FIG. 10 plots the temperature profile as a function of time used for the simulation shown in FIG. 9.
Figure 11:
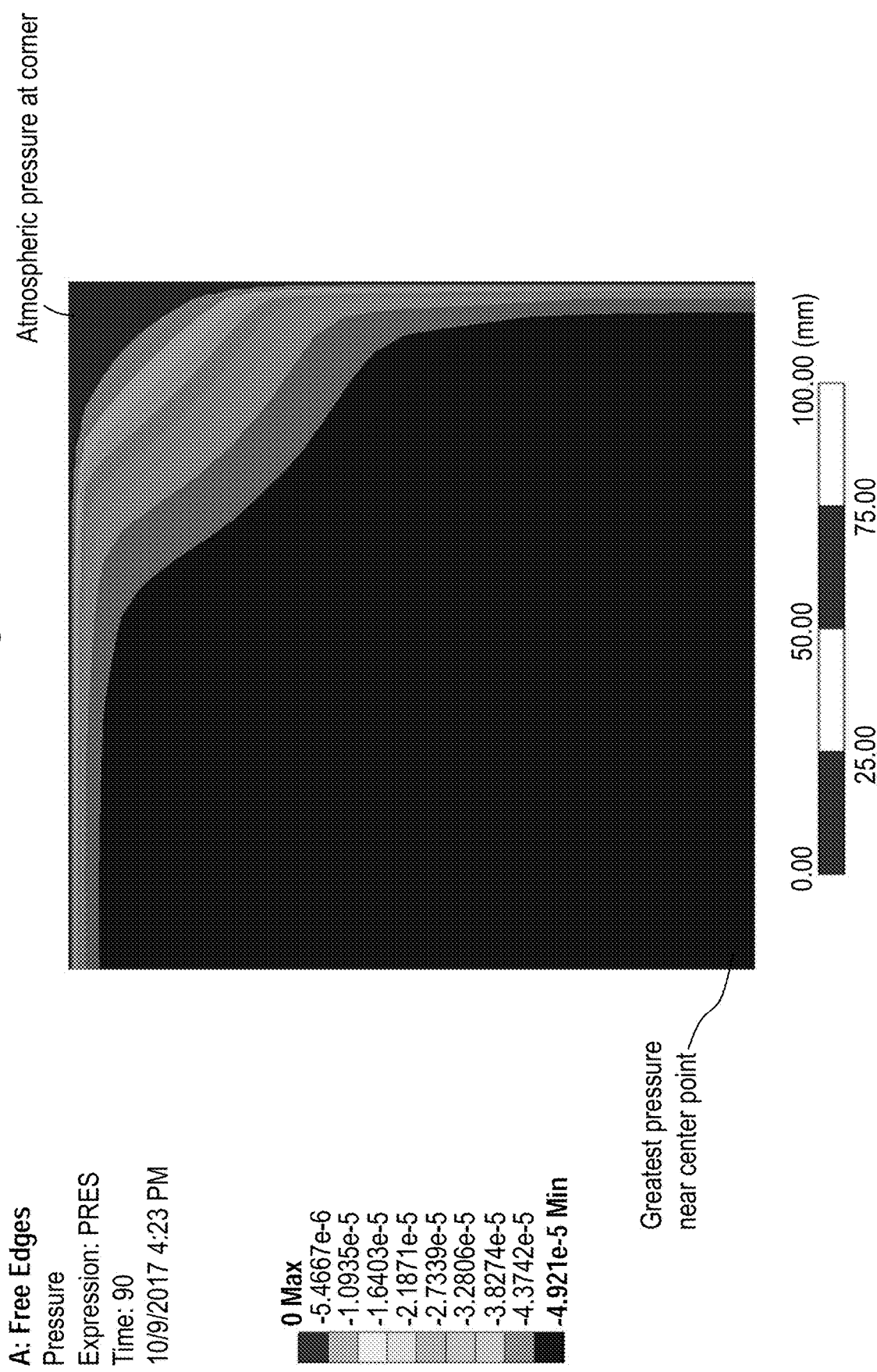
FIG. 11 illustrates the changes in pressure magnitude across the area of the glass substrate stack without a temporary bond between the glass substrates from near the center point to a corner of the stack.

FIG. 10 shows the temperature profile that was applied in the simulation under gravity (as-is), during which the substrates were allowed to sag. FIG. 9 illustrates the resulting co-shaped stack of the first and second glass substrates at 120 seconds, after the temperature is returned to the starting temperature of 400° C. The results of simulations show that the first and the second glass substrates are separated by a gap or distance of 0.675 mm at the center point of both glass substrates after 129 seconds. A source of separation can be seen in FIG. 9, where the plates have become separated in the corner. This separation is driven by mechanical forces related to bending the glass substrates in the corner. The second glass substrate (positioned on top of the first glass substrate) bends to a lesser extent due to its higher viscosity, resulting in an opening in the corner. This opening allows air to enter and reduces the effect of pressure between the glass substrates. FIG. 11 shows the reduced pressure magnitude, especially in the corner. In FIG. 11, the legend shows pressure approaching atmospheric pressure (max, atmospheric pressure) and a negative pressure (min, greatest pressure). Specifically, FIG. 11 shows the pressure gradient (in units of Pascals) at the end of the high temperature portion of the co-shaping process and shows a difference in pressure at the corner versus the at the center point indicating an opening between plates that allows air to enter between the first and second glass substrates.

This observation indicated closing the opening in the corner should promote formation of a temporary bond between the first and second glass substrates. This was observation and the solution of closing the opening was confirmed by experimentation (Examples A-D). In Examples A and B, a first glass substrate was a soda lime silicate glass having a thickness of 2.1 mm and the second glass substrate was an aluminosilicate glass having a thickness of 0.55 mm, which was positioned on top of the first glass substrate. The first and second glass substrates had length and width dimensions of 12 inches (12 inches×12 inches). The aluminosilicate glass substrate includes a composition of 67 mol % SiO2, 8.52 mol % Al2O3, 14 mol % Na2O, 1.2 mol % K2O, 6.5 mol % MgO, 0.5 mol % CaO, and 0.2 mol % SnO2. In Example A, no reinforcement was applied to the corner locations of the stack and the stack was co-shaped in a static furnace. In Example B, reinforcement was applied, in the form of a metallic clip, to each of the four corners of the stack to clamp together the first and second glass substrate at each corner of the stack before co-shaping in the same static furnace. Table 1 compares the mismatch in sag depths for Examples A and B. Example B showed a reduced mismatch when reinforcement was applied, indicating the effectiveness of closing the opening created at the corners of the stack during bending. As used herein, mismatch indicates a difference in sag depth between the first and second glass substrate. For example, if first glass substrate achieves a sag depth of 10 mm, and the second glass substrate achieves a sag depth of 5 mm, there is a shape mismatch of 5 mm.

TABLE 1

Shape mismatch between first glass substrate and second glass substrate after co-sagging with and without clips attached at the corner location of the stack.

| Example | Second glass substrate thickness (aluminosilicate, top position) | First glass substrate thickness (SLG, bottom position) | Clip | Shape mismatch |
| --- | --- | --- | --- | --- |
| A (baseline) | 0.55 mm | 2.1 mm | No | 3.3 mm |
| B | 0.55 mm | 2.1 mm | Yes | 1.7 mm |

As illustrated in Table 1, in one or more embodiments, the method may include forming a temporary bond between the first and second glass substrates by preventing or closing any openings between the glass substrates at a portion of the edge or periphery (e.g., the corners) of the stack or the entire edge or periphery of the stack. In one or more embodiments, the method may include forming and/or maintaining a temporary bond between the first and second glass substrates by maintaining contact (direct or indirect via a separation powder or intervening material) between the glass substrates at a portion of the edge or periphery (e.g., the corners) of the stack or the entire edge or periphery of the stack.

Alternative methods of forming the temporary bond were evaluated in Examples C and D. In Examples C and D, a first glass substrate was a soda lime silicate glass having a thickness of 2.1 mm and the second glass substrate was an aluminosilicate glass having a thickness of 0.7 mm, which was positioned on top of the first glass substrate. The first and second glass substrates had length and width dimensions of 12 inches (12 inches×12 inches). The aluminosilicate glass substrate includes a composition of 67 mol % $SiO_2$, 8.52 mol % $Al_2O_3$, 14 mol % $Na_2O$, 1.2 mol % $K_2O$, 6.5 mol % MgO, 0.5 mol % CaO, and 0.2 mol % $SnO_2$. In Example C, no reinforcement was applied to the stack before it was co-shaped in a static furnace. In Example D, a mechanical means of closing the opening was used and included placing counterweights on the stack at or near the corners before co-shaping in the same static furnace. Table 2 compares the measured shape mismatch between Example C and D. Again, a lower mismatch is achieved when using counterweights to form or maintain the temporary bond between the first and second glass substrates.

TABLE 2

Shape mismatch between first glass substrate and second glass substrate after co-sagging with and without counterweights placed on top of the stack at the corner locations.

| Example | Second glass substrate thickness (aluminosilicate, top position) | First glass substrate thickness (SLG, bottom position) | Counterweight | Shape mismatch |
|---|---|---|---|---|
| C (baseline) | 0.7 mm | 2.1 mm | No | 1.8 mm |
| D | 0.7 mm | 2.1 mm | Yes | 0.9 mm |

Figure 12:
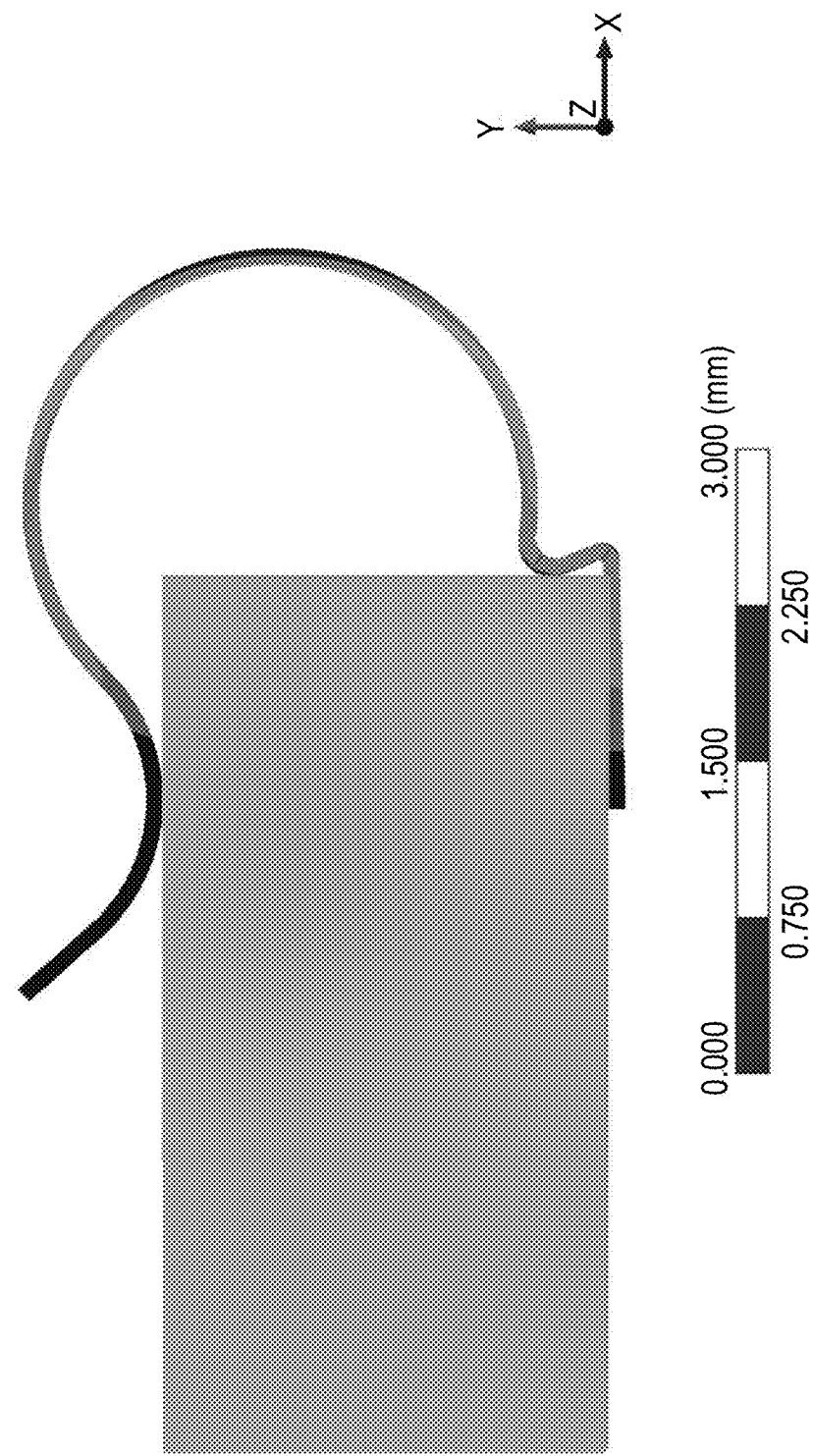
FIG. 12 is an illustration of a simulation of reinforcement that forms and/or maintains a temporary bond between the glass substrates during co-shaping.

Numerical analysis was also performed to simulate the effect of a temporary bond and the resulting substrate separation. FIG. 12 shows an image of an exemplary reinforcement (in the form of a clip) applied at the corner in a numerical simulation. The particular design shown in FIG. 12 exerts a force of 0.4 N on the stack over a length of about 6 mm. As a result, the maximum separation between glass substrates with reinforcement on the corners is reduced to 0.164 mm at 129 seconds, as shown in FIG. 13 (compared to a 0.675 mm gap that was seen in FIG. 9 when no clips were used). The use of additional reinforcement along the edges of the substrates farther away from the corners would further reduce separation. In addition, the use of glass compositions that have viscosities that are more closely matched than the soda lime silicate and aluminosilicate glasses used in the simulations would produce even less separation between the glass substrates. FIG. 13 shows the simulated change in pressure magnitude across the area of the stack of FIG. 12, indicating the formation of a temporary bond via a vacuum force.

The method of forming a temporary bond was applied to glass substrates having a size and shape for use in an automotive windshield. In Examples E and F, a first glass substrate was a soda lime silicate glass having a thickness of 2.1 mm and the second glass substrate was an aluminosilicate glass having a thickness of 0.7 mm, which was positioned on top of the first glass substrate. Example E included two runs during which no reinforcement was applied to the stack before the stack was placed on a bending tool and co-shaped by co-sagging in a lehr furnace. Example F included two runs during which clips were applied around the periphery of the stack including at or near the corners before co-shaping in the same manner as Example E.

Figure 14A:
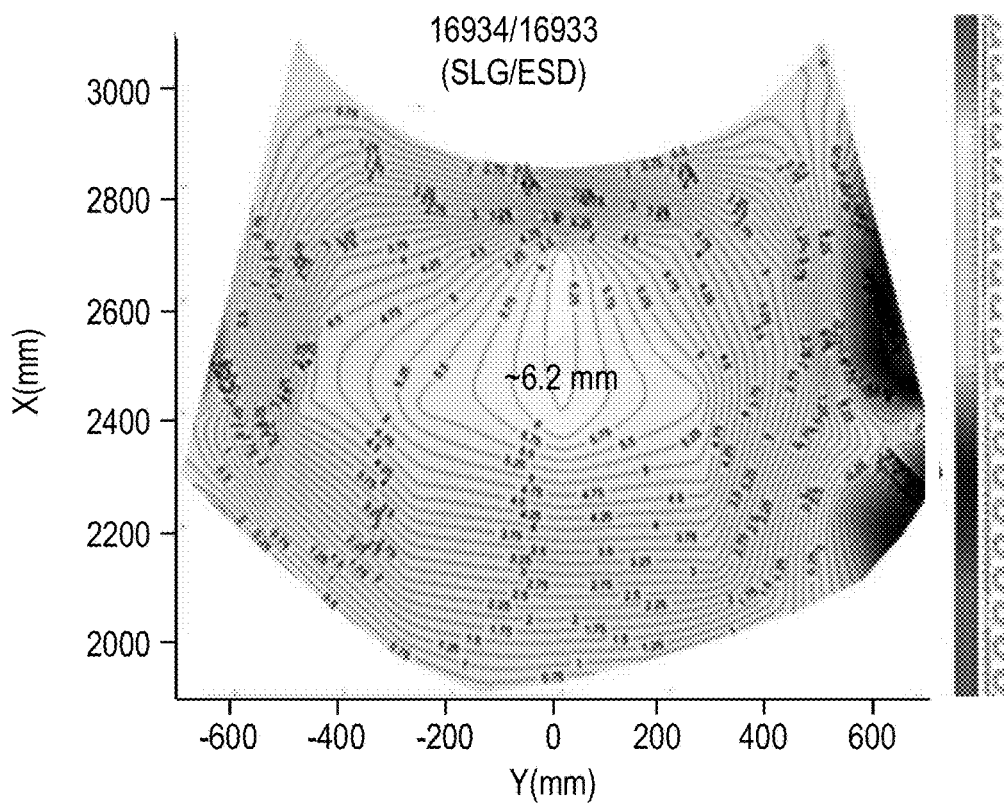
FIGS. 14A-B illustrate shape measurements of Example E.
Figure 14B:
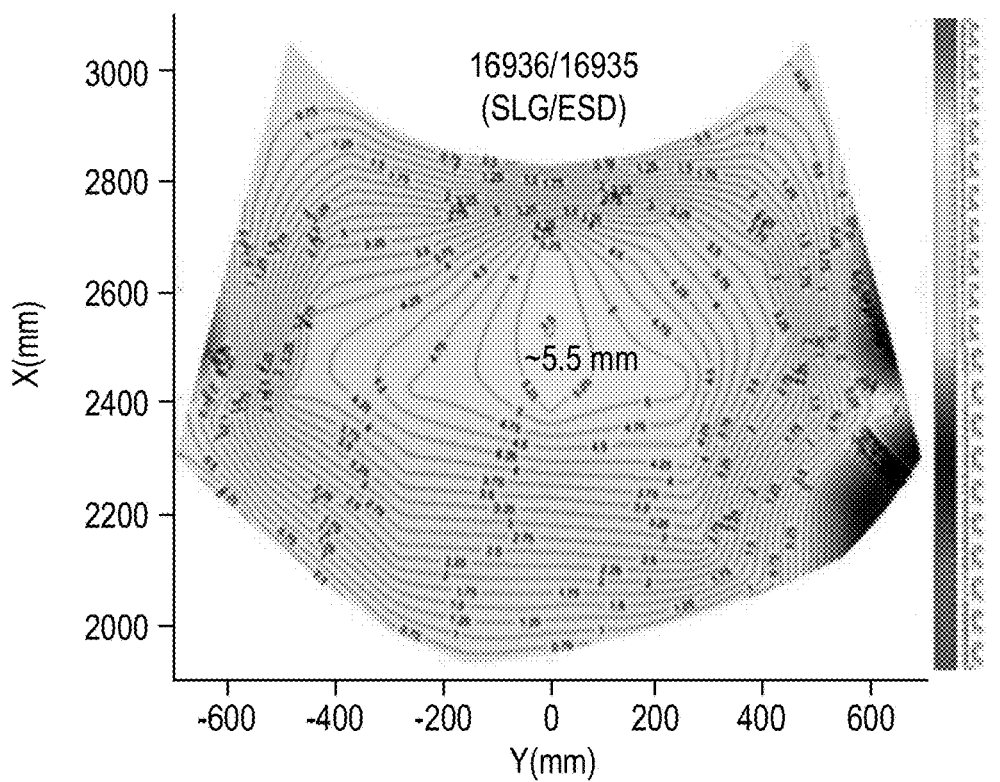
Figure 15A:
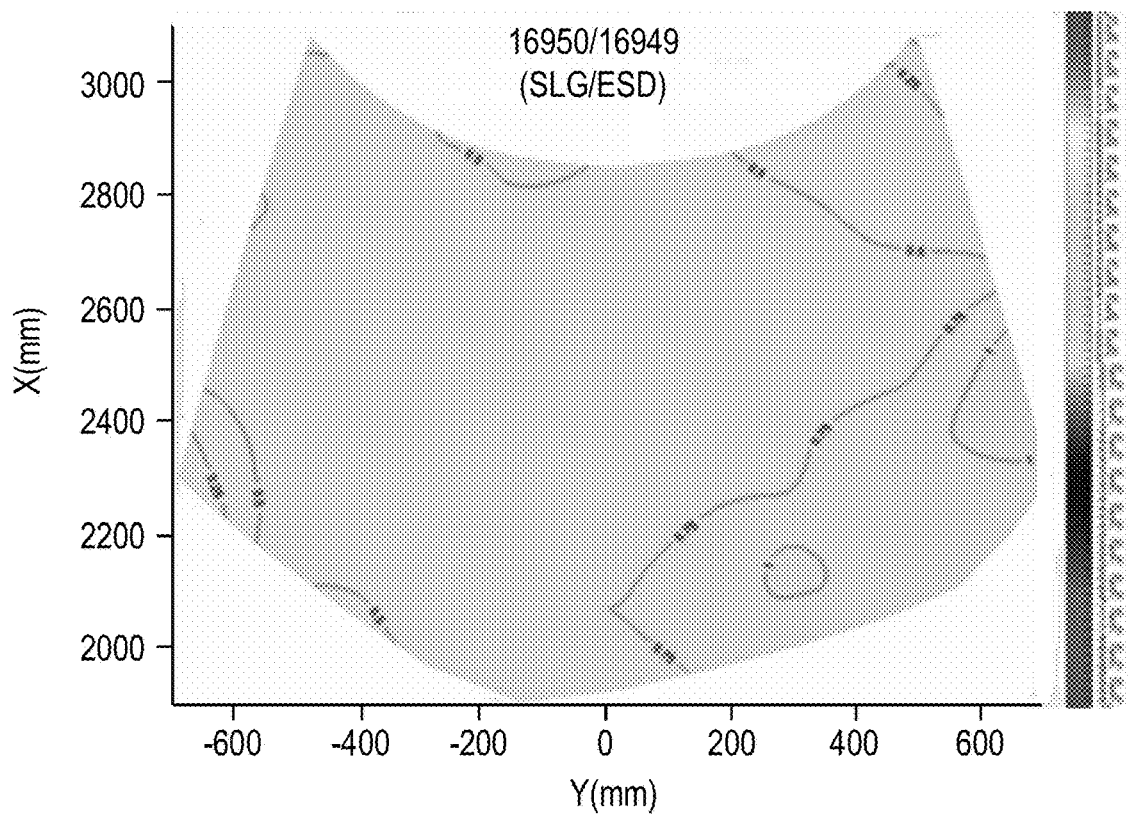
FIGS. 15A-B illustrate shape measurements of Example F.
Figure 15B:
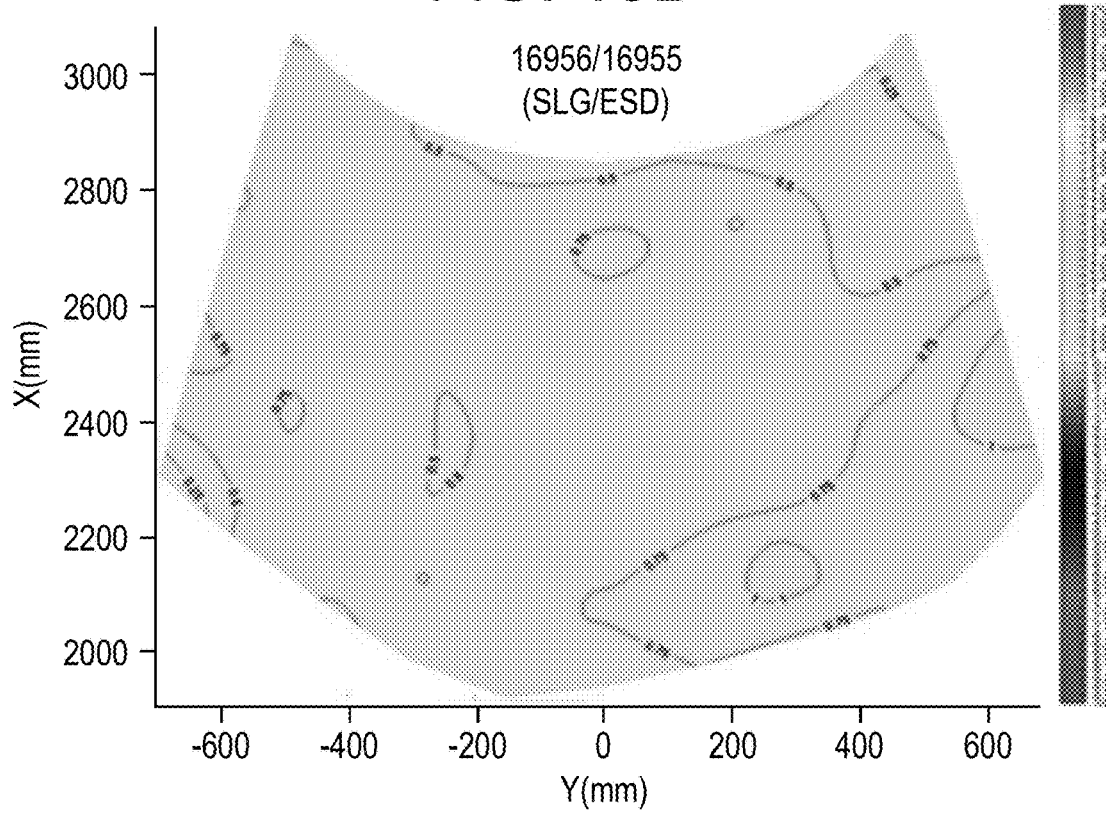

FIGS. 14A-B and 15A-B show the shape mismatch between the first glass substrate and the second glass substrates for each run of Examples E and F, respectively. Example E demonstrated a shape mismatch in a range from about 6.2 mm (FIG. 14A) and 5.5 mm (FIG. 14B). Example F demonstrated a 0.1 mm shape mismatch in both runs (FIGS. 15A-B). Specifically, the first glass substrate achieved a 12.1 mm sag depth and the second glass substrate achieved a 12 mm sag depth in both runs.

Figure 16A:
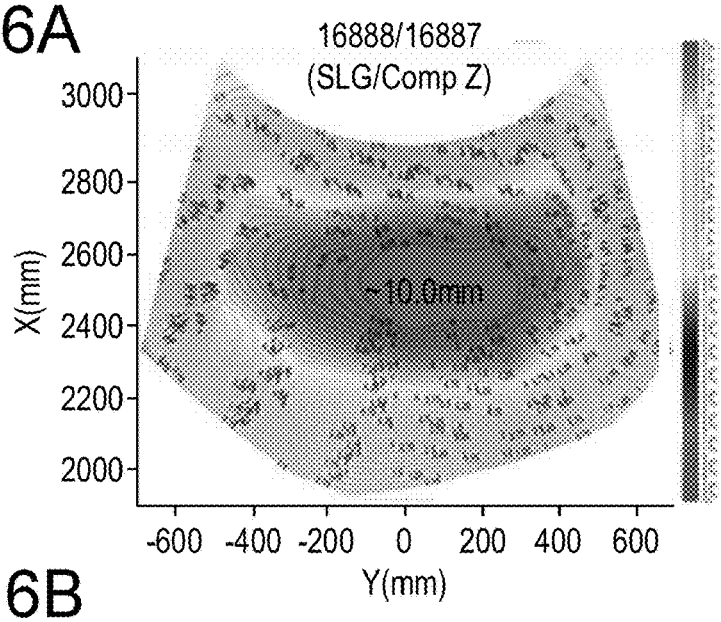
FIGS. 16A-C illustrate shape measurements of Example G.
Figure 16B:
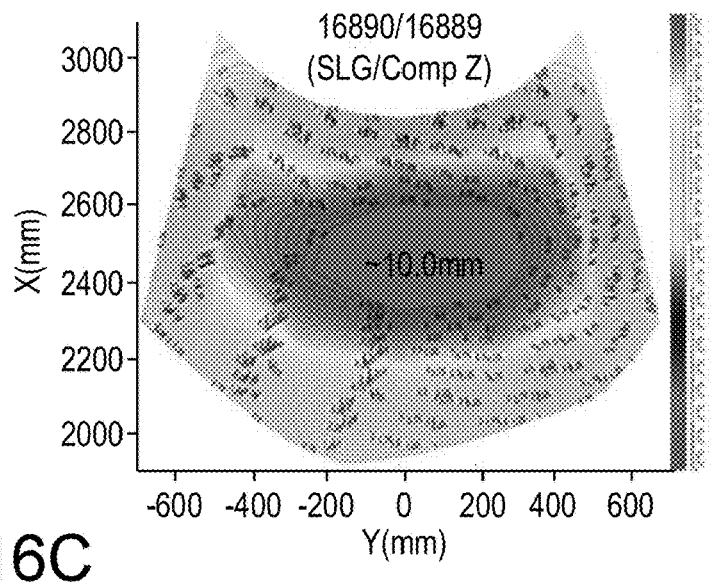
Figure 16C:
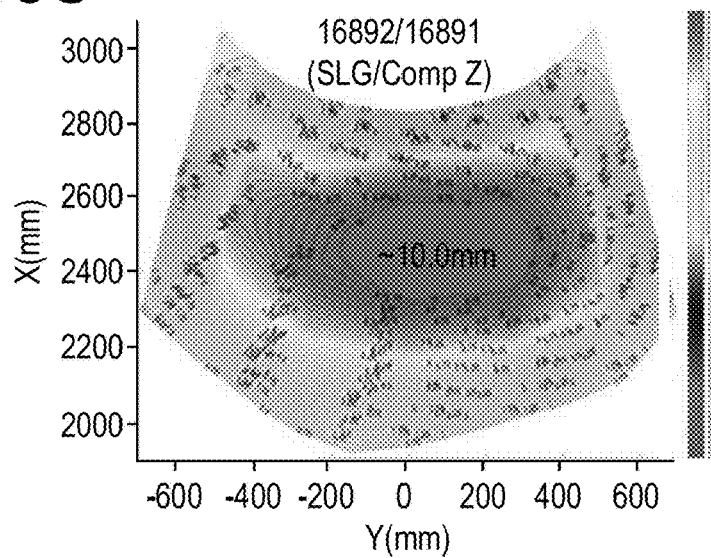
Figure 17A:
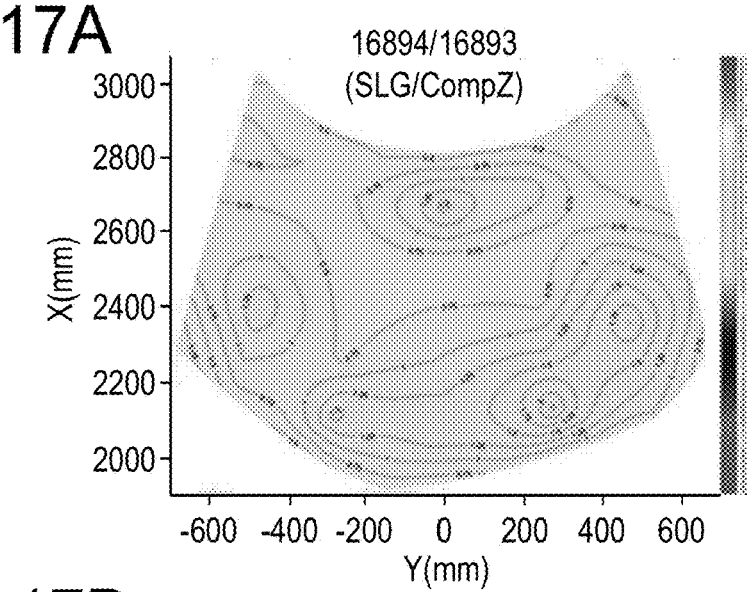
FIGS. 17A-C illustrate shape measurements of Example H.
Figure 17B:
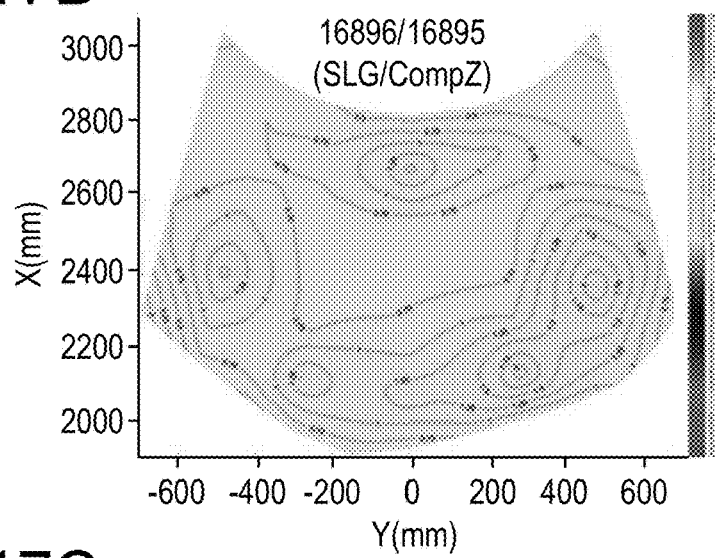
Figure 17C:
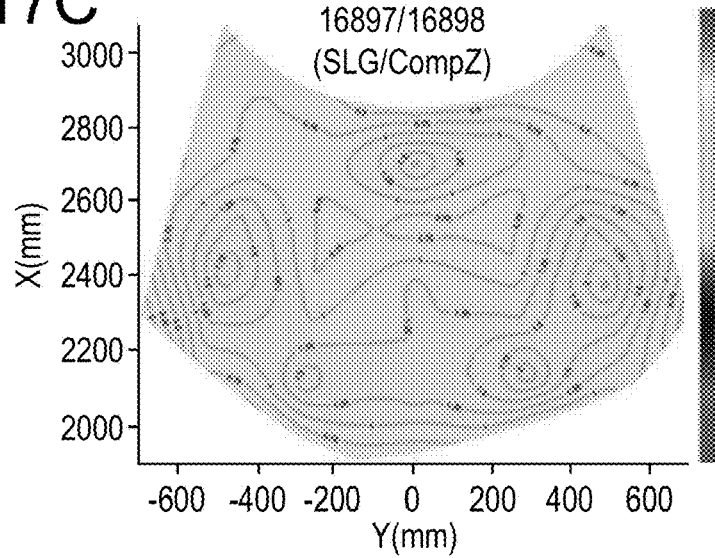

Examples G and H used the same first and second glass substrates as Examples E and F and the same co-shaping process and equipment, but used counterweights instead of clips for reinforcement. Example G included three runs without reinforcement, and each run resulted in a shape mismatch of about 10 mm, as show in FIGS. 16A-C. Example H included three runs with each run including counterweights positioned at or near the corners of the stack. As shown in FIGS. 17A-C, counterweights at the corner locations resulted in a shape mismatch of less than 0.5 mm.

As shown above, numerical models and experimental data show the effect of pressure distribution and resulting air flow from the corners of a stack on the shape mismatch between glass substrates. Models predicted that a lack of a temporary bond between the glass substrate during co-shaping will result in a large shape mismatch between glass substrates due to viscosity and bending stiffness difference between glass substrate. Experiments confirmed simulation observations that closing or preventing air passage between glass substrates will result in a much improved shape match. The negative pressure (or vacuum force) generated between glass substrate during co-shaping keeps the two glass substrates (with different viscosities) together. As long as a seal can be maintained at the glass substrate edges a good shape match can be achieved between two glass substrates having different viscosities.

In one or more embodiments, the method includes preventing wrinkling at the peripheral portions (315, 325) of the first glass substrate and the second glass substrate. In one or more embodiments, preventing wrinkling includes shielding at least a portion or the entire peripheral portions (315, 325) of the first and second glass substrates from the heat the stack during bending.

In one or more embodiments, the method may include placing separation powder between the first glass sheet and the second glass sheet before heating and co-shaping.

In some embodiments, the method includes inserting an interlayer between the first curved glass substrate and the second curved glass substrate, and laminating the first curved glass substrate, the interlayer, and the second curved glass substrate together.

EXAMPLES

Various embodiments will be further clarified by the following examples.

Example 1

Three glass substrates were considered for use in a shaped laminate. Substrate A was made from a soda lime glass composition. Substrate B1 is a three-layer glass composite including a core layer made from a first composition and two clad layers surrounding the core layer made from a second composition having a different coefficient of thermal expansion, causing glass substrates made from composition B1 to be mechanically strengthened. Substrate B2 is made from an aluminosilicate glass composition (including about 67 mol % SiO2, 8.52 mol % Al2O3, 14 mol % Na2O, 1.2 mol % K2O, 6.5 mol % MgO, 0.5 mol % CaO, and 0.2 mol % SnO2) that was capable of being chemically strengthened after the bending process is complete. The respective viscosity as a function of temperature for each of Substrate A, Substrate B1 and Substrate B2 is shown in FIG. 4.

A sample of Substrate A having a thickness of 2 mm was sagged individually by heating in a lehr furnace to a maximum temperature of 630° C. for 110 seconds (including indexing time to move from one station in the lehr to another) and achieved a sag depth of about 20 mm. Substrates B1 and B2 were individually subjected to the same sagging conditions as Substrate A to investigate whether glass substrates made from different glass compositions could be co-shaped (and contrary to the general understanding the in the field).

In a first approximation, the temperature of the glass substrates was assumed to be the same as the set point of the lehr furnace (i.e., the target temperature entered into the lehr furnace) and the respective viscosity of the glass substrates at 630° C. and 660° C. was approximated as shown in Table 3.

TABLE 3

Viscosity information for Substrates A, B1 and B2.

| Temperature | Substrate A viscosity (poises) | Substrate B1 viscosity (poises) | Substrate B2 viscosity (poises) |
|---|---|---|---|
| 630° C. | $6 \times 10^9$ | $1.8 \cdot 10^{11}$ | $4.5 \cdot 10^{12}$ |
| 660° C. | $8 \times 10^8$ | $3 \times 10^{10}$ | |

Substrate B1 had a thickness of 0.55 mm and was sagged individually by heating in a lehr furnace to a maximum temperature of 630° C. for 110 seconds (including indexing time to move from one station in the lehr to another) and achieved a sag depth of about 2 mm. This result is expected in view of the higher viscosity exhibited by composition B1 (in comparison with composition A).

Substrate B1 was stacked on top of Substrate A, and this stack was then co-sagged by heating in a lehr furnace to a maximum temperature of 630° C. for 110 seconds (including indexing time to move from one station in the lehr to another). Based on the known understanding of glass viscosity, it was expected that each of Substrate A and Substrate B (while in the stack) would achieve substantially the same sag depth as achieved when the substrates were individually sagged. Surprisingly, the stack (including both Substrate A and Substrate B1) achieved a sag depth of about 6 mm.

A stack with Substrate B1 on stacked on top of Substrate A was then co-sagged by heating in a lehr furnace to a maximum temperature of 660° C. for 110 seconds (including indexing time to move from one station in the lehr to another). The sagging of both Substrate A and Substrate B1 (while in the stack) was the substantially identical and their sag depth increased to 2.0 mm.

Without being bound by theory, it is believed that a temporary bond is formed between the two glass substrates during the co-sagging process, which prevents the glass substrate made from composition A from sagging too deep and which facilitates sagging of the glass substrate made from composition B1.

Without being bound by theory it is also believed that the stack approximately exhibits an effective viscosity based on the individual glass substrate thicknesses and viscosities at a given temperature, based on Equation (1), Accordingly, Substrate A sagged individually to a sag depth of 20 mm after being heated to 630° C. at which the viscosity of Substrate A is $6 \times 10^9$ poises. However, when a stack including Substrate B1 stacked on top of Substrate A was heated to 660° at which the effective viscosity according to Equation (1) is $6.86 \times 10^9$ poises (which approaches the viscosity of Substrate A at 630° C.), the stack achieved a sag depth of 20 mm. Table 4 below shows the viscosity of Substrate A and the effective viscosity of the stack including Substrate A and Substrate B1. It is believed that the small difference between the effective viscosity of the stack at 660° C. and the viscosity of Substrate A at 630° C. is due to possible differences between the glass temperature and the lehr furnace set point. In addition, it is believed the difference in effective viscosity is due to the mass difference between the stacks. Heat is applied for the same duration to both stacks; however, the difference in effective viscosity is due to additional thickness of glass (i.e., having at thickness of 0.7 mm) to heat for shaping.

Accordingly, even glass substrates having very different viscosities from one another can be successfully co-sagged according to the embodiments described herein.

TABLE 4

Viscosities of Substrate A, Substrate B1, and the effective viscosity of a stack including Substrate A and Substrate B.

| Temperature | Substrate A viscosity (poises) | Substrate B1 viscosity (poises) | Effective viscosity of Substrates A + B1 (poises) |
|---|---|---|---|
| 630° C. | $6 \times 10^9$ | | |
| 660° C. | $8 \times 10^8$ | $3 \times 10^{10}$ | $6.86 \times 10^9$ |

Substrate A was placed on top of Substrate B1 to form a stack. The stack was then heated to a temperature of about 660° C. and achieved a sag depth exceeding 20 mm. Without being bound by theory, it is theorized that Substrate B1 retained Substrate A from sagging further, despite the additional weight of thicker Substrate A on thinner Substrate B1. Moreover, the increased sag depth of the stack compared to Substrate B1 alone is believed to be due to temporary bond formed between the substrates during co-sagging. Without being bound by theory, such temporary bonding may include the formation of an attractive force between the substrates (which may include an electrostatic force).

Substrate B2 was placed on top of Substrate A to form a stack. As shown in FIG. 4, there is a greater difference in the viscosity curves of Substrate A and Substrate B2 (in comparison to the curves of Substrate A and Substrate B1). When Substrate B2 had a thickness of 0.7 mm, the stack did not achieve a suitable sag depth; however, when Substrate B2 had a thickness of 0.55 mm, the stack achieved a suitable sag depth. Without being bound by theory, it is believed that a thinner glass substrate stacked on a thicker glass substrate creates improved contact and potentially improved temporary bonding between the two glass substrates, which is believed to result in improved co-shaping.

Example 1 shows that a pair of glass substrates having different thickness and different viscosity (and likely composition) can be successfully co-shaped and such co-shaping is driven by an effective viscosity of the stack.

Example 2

Comparative Examples 2A-2B, Examples 2C-2F, Comparative Example 2G, and Examples 2H-2N were formed in a lehr furnace. Comparative Examples 2A-2B and 2G are single glass substrates, and Examples 2C-2F and 2H-2N are co-shaped laminates according to one or more embodiments. Table 5 shows the construction of each example, and the achieved sag depth. In the examples, the top glass substrate is placed on the bottom glass substrate to form a stack. Where only a single glass substrate is used, it is denoted as the bottom glass substrate. The sag depth of each glass substrate is measured after separating the glass substrates, where applicable.

TABLE 5

Example 2 configurations and sag depths.

| Example | Bottom glass substrate and thickness | Top glass substrate and thickness | Sag depth of bottom glass substrate (mm) | Sag depth of top glass substrate (mm) | Lehr Set point (° C.) |
|---|---|---|---|---|---|
| 2A | Substrate A (2.1 mm) | — | 19.23 | — | 630 |
| 2B | Substrate B1 (0.55 mm) | — | 2.01 | — | 630 |
| 2C | Substrate A (2.1 mm) | Substrate B1 (0.55 mm) | 6.26 | 6.02 | 630 |
| 2D | Substrate B1 (0.55 mm) | Substrate A (2.1 mm) | 6.07 | 5.45 | 630 |
| 2E | Substrate A (2.1 mm) | Substrate B1 (0.55 mm) | 5.01 | 5.06 | 630 |
| 2F | Substrate A (2.1 mm) | Substrate B2 (0.7 mm) | 8.08 | 0 | 630 |
| 2G | Substrate A (2.1 mm) | — | 20.07 | — | 630 |
| 2H | Substrate B1 (0.55 mm) | — | 1.46 | — | 630 |
| 2I | Substrate A (2.1 mm) | Substrate B2 (0.55 mm) | 0.56 | 0.31 | 630 |
| 2J | Substrate A (2.1 mm) | Substrate A (0.7 mm) | 17.02 | 16.85 | 630 |
| 2K | Substrate A (2.1 mm) | Substrate B1 (0.55 mm) | 19.22 | 20.07 | 660 |
| 2L | Substrate A (2.1 mm) | Substrate B2 (0.55 mm) | 1.29 | 0.29 | 630 |
| 2M | Substrate A (2.1 mm) | Substrate B1 (0.55 mm) | 17.28 | 17.39 | 655 |
| 2N | Substrate A (2.1 mm) | Substrate B1 (0.55 mm) | 26.72 | 25.94 | 665 |

Aspect (1) of this disclosure pertains to a laminate comprising: a first curved glass substrate comprising a first major surface, a second major surface opposing the first major surface, a first thickness defined as the distance between the first major surface and second major surface, and a first sag depth of about 2 mm or greater, the first curved glass substrate comprising a first viscosity (poises) at a temperature of 630° C.; a second curved glass substrate comprising a third major surface, a fourth major surface opposing the third major surface, a second thickness defined as the distance between the third major surface and the fourth major surface, and a second sag depth of about 2 mm or greater, the second curved glass substrate comprising a second viscosity that is greater than the first viscosity at a temperature of 630° C.; and an interlayer disposed between the first curved glass substrate and the second curved glass substrate and adjacent the second major surface and third major surface, wherein the first sag depth is within 10% of the second sag depth and a shape deviation between the first glass substrate and the second glass substrate of ±5 mm or less as measured by an optical three-dimensional scanner, and wherein one of or both the first major surface and the fourth major surface exhibit an optical distortion of less than 200 millidiopters as measured by an optical distortion detector using transmission optics according to ASTM 1561, and wherein the first major surface or the second major surface comprises a membrane tensile stress of less than 7 MPa as measured by a surface stressmeter, according to ASTM C1279.

Aspect (2) of this disclosure pertains to the laminate of Aspect (1), wherein, at a temperature of about 630° C., the second viscosity is in a range from about 10 times the first viscosity to about 750 times the first viscosity.

Aspect (3) of this disclosure pertains to the laminate of Aspect (1) or Aspect (2), wherein the glass stack comprises an effective viscosity that is between the first viscosity and the second viscosity at a temperature (T) in a range from about 500° C. to about 700° C., and is determined by the equation: $\mu_{\mathit{eff}}(T)=((\mu_1(T)t_1)/(t_1+t_2))+((\mu_2(T)t_2)/(t_1+t_2))$, where $\mu_1(T)$ is the viscosity of the first curved glass substrate at temperature (T), $t_1$ is the thickness of the first curved glass substrate, $\mu_2(T)$ is the viscosity of the second curved glass substrate at temperature (T), $t_2$ is the thickness of the second curved glass substrate.

Aspect (4) of this disclosure pertains to the laminate of any one of Aspects (1) through (3), wherein the second thickness is less than the first thickness.

Aspect (5) of this disclosure pertains to the laminate of any one of Aspects (1) through (4), wherein the first thickness is from about 1.6 mm to about 3 mm, and the second thickness is in a range from about 0.1 mm to less than about 1.6 mm.

Aspect (6) of this disclosure pertains to the laminate of any one of Aspects (1) through (5), wherein first curved substrate comprises a first sag temperature and the second curved glass substrate comprises a second sag temperature that differs from the first sag temperature.

Aspect (7) of this disclosure pertains to the laminate of Aspect (6), wherein the difference between the first sag temperature and the second sag temperature is in a range from about 30° C. to about 150° C.

Aspect (8) of this disclosure pertains to the laminate of any one of Aspects (1) through (7), wherein the shape deviation is about ±1 mm or less.

Aspect (9) of this disclosure pertains to the laminate of any one of Aspects (1) through (8), wherein the shape deviation is about ±0.5 mm or less.

Aspect (10) of this disclosure pertains to the laminate of any one of Aspects (1) through (9), wherein the optical distortion is about 100 millidiopters or less.

Aspect (11) of this disclosure pertains to the laminate of any one of Aspects (1) through (10), wherein the membrane tensile stress is about 5 MPa or less.

Aspect (12) of this disclosure pertains to the laminate of any one of Aspects (1) through (11), wherein the second sag depth is in a range from about 5 mm to about 30 mm.

Aspect (13) of this disclosure pertains to the laminate of any one of Aspects (1) through (12), wherein the first major surface or the second major surface comprises a surface compressive stress of less than 3 MPa as measured by a surface stress meter.

Aspect (14) of this disclosure pertains to the laminate of any one of Aspects (1) through (13), wherein the laminate is substantially free of visual distortion as measured by ASTM C1652/C1652M.

Aspect (15) of this disclosure pertains to the laminate of any one of Aspects (1) through (14), wherein the second curved glass substrate is strengthened.

Aspect (16) of this disclosure pertains to the laminate of Aspect (15), wherein the second curved glass substrate is chemically strengthened, mechanically strengthened or thermally strengthened.

Aspect (17) of this disclosure pertains to the laminate of Aspect (15) or Aspect (16), wherein the first glass curved substrate is unstrengthened.

Aspect (18) of this disclosure pertains to the laminate of Aspect (15) or Aspect (16), wherein the first curved glass substrate is strengthened.

Aspect (19) of this disclosure pertains to the laminate of any one of Aspects (1) through (18), wherein the first curved glass substrate comprises a soda lime silicate glass.

Aspect (20) of this disclosure pertains to the laminate of any one of Aspects (1) through (19), wherein the first curved glass substrate comprises an alkali aluminosilicate glass, alkali containing borosilicate glass, alkali aluminophosphosilicate glass, or alkali aluminoborosilicate glass.

Aspect (21) of this disclosure pertains to the laminate of any one of Aspects (1) through (20), wherein the first curved glass substrate comprises a first length and a first width, either one of or both the first length and the first width is about 0.25 meters or greater.

Aspect (22) of this disclosure pertains to the laminate of any one of Aspects (1) through (21), wherein the first curved glass substrate comprises a first length, and a first width, and the second curved glass substrate comprises a second length that is within 5% of the first length, and a second width that is within 5% of the first width.

Aspect (23) of this disclosure pertains to the laminate of any one of Aspects (1) through (22), where the laminate is complexly curved.

Aspect (24) of this disclosure pertains to the laminate of any one of Aspects (1) through (23), wherein the laminate comprises automotive glazing or architectural glazing.

Aspect (25) of this disclosure pertains to a vehicle comprising: a body defining an interior and an opening in communication with the interior; a complexly curved laminate disposed in the opening, the laminate comprising a first curved glass substrate comprising a first major surface, a second major surface opposing the first major surface, a first thickness defined as the distance between the first major surface and second major surface, and a first sag depth of about 2 mm or greater, the first curved glass substrate comprising a first viscosity (poises), a second curved glass substrate comprising a third major surface, a fourth major surface opposing the third major surface, a second thickness defined as the distance between the third major surface and the fourth major surface, and a second sag depth of about 2 mm or greater, the second curved glass substrate comprising a second viscosity that greater than the first viscosity at a temperature of about 630° C., and an interlayer disposed between the first curved glass substrate and the second curved glass substrate and adjacent the second major surface and third major surface, wherein the first sag depth is within 10% of the second sag depth and a shape deviation between the first glass substrate and the second glass substrate of ±5 mm or less as measured by an optical three-dimensional scanner, and wherein one of or both the first major surface and the fourth major surface exhibit an optical distortion of less than 200 millidiopters as measured by an optical distortion detector using transmission optics according to ASTM 1561, and wherein the first major surface or the second major surface comprises a membrane tensile stress of less than 7 MPa as measured by a surface stressmeter, according to ASTM C1279.

Aspect (26) of this disclosure pertains to the vehicle of Aspect (25), wherein, at a temperature of 630° C., the second viscosity is in a range from about 10 times the first viscosity to about 750 times the first viscosity.

Aspect (27) of this disclosure pertains to the laminate of Aspect (25) or Aspect (26) wherein the second thickness is less than the first thickness.

Aspect (28) of this disclosure pertains to the laminate of any one of Aspects (25) through (27), wherein the second thickness is less than about 1.6 mm.

Aspect (29) of this disclosure pertains to the laminate of any one of Aspects (25) through (28), wherein the first thickness is from about 1.6 mm to about 3 mm, and the second thickness is in a range from about 0.1 mm to less than about 1.6 mm.

Aspect (30) of this disclosure pertains to the laminate of any one of Aspects (25) through (29), wherein first curved substrate comprises a first sag temperature and the second curved glass substrate comprises a second sag temperature that differs from the first sag temperature.

Aspect (31) of this disclosure pertains to the laminate of any one of Aspects (25) through (30), wherein the shape deviation is about ±1 mm or less.

Aspect (32) of this disclosure pertains to the laminate of any one of Aspects (25) through (31), wherein the optical distortion is about 100 millidiopters or less.

Aspect (33) of this disclosure pertains to the laminate of any one of Aspects (25) through (32), wherein the membrane tensile stress is about 5 MPa or less.

Aspect (34) of this disclosure pertains to the laminate of any one of Aspects (25) through (33), wherein the second sag depth is in a range from about 5 mm to about 30 mm.

Aspect (35) of this disclosure pertains to the laminate of any one of Aspects (25) through (34), wherein the first major surface or the second major surface comprises a surface compressive stress of less than 3 MPa as measured by a surface stress meter.

Aspect (36) of this disclosure pertains to the laminate of any one of Aspects (25) through (35), wherein the first curved glass substrate comprises a first tint and the second curved glass substrate comprises a second tint that differs from the first tint in the CIE L*a*b* (CIELAB) color space.

Aspect (37) of this disclosure pertains to the laminate of any one of Aspects (25) through (36), wherein the laminate is substantially free of visual distortion as measured by ASTM C1652/C1652M.

Aspect (38) of this disclosure pertains to a method of forming a curved laminate comprising: forming a stack comprising a first glass substrate comprising a first viscosity (poises) and a first sag temperature and a second glass substrate, the second glass substrate comprising a second viscosity that greater than the first viscosity at a temperature of 630° C. and a second sag temperature that differs from the first sag temperature; and heating the stack and co-shaping the stack to form a co-shaped stack, the co-shaped stack comprising a first curved glass substrate having a first sag depth and a second curved glass substrate each having a second sag depth, wherein the first sag depth and the second sag depth are greater than 2 mm and within 10% of one another.

Aspect (39) of this disclosure pertains to the method of Aspect (38), wherein the second glass substrate is disposed on the first glass substrate.

Aspect (40) of this disclosure pertains to the method of Aspect (38), wherein the first glass substrate is disposed on the second glass substrate.

Aspect (41) of this disclosure pertains to the method of any one of Aspects (38) through (40), wherein heating the stack comprises heating the stack to a temperature different from the first sag temperature and the second sag temperature.

Aspect (42) of this disclosure pertains to the method of any one of Aspects (38) through (41), wherein heating the stack comprises heating the stack to a temperature between the first sag temperature and the second sag temperature.

Aspect (43) of this disclosure pertains to the method of any one of Aspects (38) through (40), wherein heating the stack comprises heating the stack to the first sag temperature.

Aspect (44) of this disclosure pertains to the method of any one of Aspects (38) through (40), wherein heating the stack comprises heating the stack to the second sag temperature.

Aspect (45) of this disclosure pertains to the method of any one of Aspects (38) through (44), wherein the first sag depth or the second sag depth is in a range from about 6 mm to about 30 mm.

Aspect (46) of this disclosure pertains to the method of any one of Aspects (38) through (45), further comprising placing the stack on a female mold and heating the stack on the female mold.

Aspect (47) of this disclosure pertains to the method of Aspect (46), wherein co-shaping the stack comprises sagging the stack using gravity through an opening in the female mold.

Aspect (48) of this disclosure pertains to the method of Aspect (46) or Aspect (47), further comprising applying a male mold to the stack.

Aspect (49) of this disclosure pertains to the method of Aspect (46) or Aspect (47), further comprising applying a vacuum to the stack to facilitate co-shaping the stack.

Aspect (50) of this disclosure pertains to the method of any one of Aspects (38) through (49), wherein heating the stack comprises heating the stack at a constant temperature while varying the duration of heating until the co-shaped stack is formed.

Aspect (51) of this disclosure pertains to the method of any one of Aspects (38) through (49), wherein heating the stack comprises heating the stack for a constant duration, while varying the temperature of heating until the co-shaped stack is formed.

Aspect (52) of this disclosure pertains to the method of any one of Aspects (38) through (51), the method of any one of claims 38-51, wherein co-shaping the stack comprises heating the stack at a constant temperature during co-shaping.

Aspect (53) of this disclosure pertains to the method of any one of Aspects (38) through (51), wherein co-shaping the stack comprises heating the stack at a constantly increasing temperature during co-shaping.

Aspect (54) of this disclosure pertains to the method of any one of Aspects (38) through (45), wherein the stack comprises opposing major surfaces each comprising a central portion and an edge portion surrounding the central portion, wherein heating the stack comprises creating a temperature gradient between the central portion and the edge portion.

Aspect (55) of this disclosure pertains to the method of Aspect (54), wherein creating a temperature gradient comprises applying heat unevenly to the central portion and the edge portion.

Aspect (56) of this disclosure pertains to the method of any one of Aspects (38) through (55), further comprising generating an electrostatic force or a vacuum between the first glass substrate and the second glass substrate.

Aspect (57) of this disclosure pertains to the method of Aspect (56), wherein the electrostatic force or the vacuum is generated while heating the stack to the first sag temperature.

Aspect (58) of this disclosure pertains to the method of Aspect (56), wherein the electrostatic force or the vacuum is generated while co-shaping the stack.

Aspect (59) of this disclosure pertains to the method of Aspect (56), wherein the electrostatic force or the vacuum is generated while heating the stack and co-shaping the stack.

Aspect (60) of this disclosure pertains to the method of any one of Aspects (38) through (59), further comprising forming a temporary bond between the first glass substrate and the second glass substrate.

Aspect (61) of this disclosure pertains to the method of Aspect (60), wherein the temporary bond comprises an electrostatic force.

Aspect (62) of this disclosure pertains to the method of any one of Aspects (38) through (61), further comprising placing separation powder between the first glass sheet and the second glass sheet before heating and shaping.

Aspect (63) of this disclosure pertains to the method of any one of Aspects (38) through (61), further comprising inserting an interlayer between the first curved glass substrate and the second curved glass substrate, and laminating the first curved glass substrate, the interlayer, and the second curved glass substrate together.

It will be apparent to those skilled in the art that various modifications and variations can be made without departing from the spirit or scope of the invention.

What is claimed is:

1. A laminate comprising:
   a first curved glass substrate comprising a first major surface, a second major surface opposing the first major surface, a first thickness defined as a distance between the first major surface and the second major surface, a first sag depth of about 2 mm or greater, and the first curved glass substrate comprising a first viscosity;

a second curved glass substrate comprising a third major surface, a fourth major surface opposing the third major surface, a second thickness defined as a distance between the third major surface and the fourth major surface, a second sag depth of about 2 mm or greater, and the second curved glass substrate comprising a second viscosity that is greater than the first viscosity at a temperature of 630° C.; and an interlayer disposed between the first curved glass substrate and the second curved glass substrate and adjacent the second major surface and the third major surface, wherein the first sag depth is within 10% of the second sag depth and a shape deviation between the first glass substrate and the second glass substrate is ±5 mm or less as measured by an optical three-dimensional scanner, wherein the laminate comprises an effective viscosity that is between the first viscosity and the second viscosity at a temperature (T) in a range from about 500° C. to about 700° C., and is determined by the equation: $\mu eff(T)=((\mu 1(T)t1)/(t1+t2))+((\mu 2(T)t2)/(t1+t2))$, where $\mu 1(T)$ is the viscosity of the first curved glass substrate at temperature (T), t1 is the thickness of the first curved glass substrate, $\mu 2(T)$ is the viscosity of the second curved glass substrate at temperature (T), t2 is the thickness of the second curved glass substrate, wherein one of or both the first major surface or the fourth major surface exhibits an optical distortion of less than 200 millidiopters as measured by an optical distortion detector using transmission optics according to ASTM 1561, and wherein the first major surface or the second major surface comprises a membrane tensile stress of less than 7 MPa as measured by a surface stressmeter, according to ASTM C1279.

2. The laminate of claim 1, wherein, at a temperature of about 630° C., the second viscosity is in a range from about 10 times the first viscosity to about 750 times the first viscosity.

3. The laminate of claim 1, wherein the second thickness is less than the first thickness.

4. The laminate of claim 1, wherein the first curved glass substrate comprises a first sag temperature and the second curved glass substrate comprises a second sag temperature that differs from the first sag temperature and wherein a difference between the first sag temperature and the second sag temperature is in a range from about 30° C. to about 150° C.

5. The laminate of claim 1, wherein the second sag depth is in a range from about 5 mm to about 30 mm.

6. The laminate of claim 1, wherein the laminate is substantially free of visual distortion as measured by ASTM C1652/C1652M.

7. The laminate of claim 1, wherein one of or both the first curved glass substrate or the second curved glass substrate comprises a compressive stress region and a central tension region formed by a coefficient of thermal expansion difference between portions of the corresponding curved glass substrate that mechanically strengthens the corresponding curved glass substrate.

8. A vehicle comprising:
a body defining an interior and an opening in communication with the interior;
a complexly-curved laminate disposed in the opening, the complexly-curved laminate comprising:

a first curved glass substrate comprising a first major surface, a second major surface opposing the first major surface, a first thickness defined as a distance between the first major surface and the second major surface, and a first sag depth of about 2 mm or greater, the first curved glass substrate comprising a first viscosity;

a second curved glass substrate comprising a third major surface, a fourth major surface opposing the third major surface, a second thickness defined as a distance between the third major surface and the fourth major surface, a second sag depth of about 2 mm or greater, and the second curved glass substrate comprising a second viscosity that is greater than the first viscosity at a temperature of about 630° C.; and an interlayer disposed between the first curved glass substrate and the second curved glass substrate and adjacent the second major surface and the third major surface, wherein the first sag depth is within 10% of the second sag depth and a shape deviation between the first curved glass substrate and the second curved glass substrate is ±5 mm or less as measured by an optical three-dimensional scanner, wherein the laminate comprises an effective viscosity that is between the first viscosity and the second viscosity at a temperature (T) in a range from about 500° C. to about 700° C., and is determined by the equation: $\mu eff(T)=((\mu 1(T)t1)/(t1+t2))+((\mu 2(T)t2)/(t1+t2))$, where $\mu 1(T)$ is the viscosity of the first curved glass substrate at temperature (T), t1 is the thickness of the first curved glass substrate, $\mu 2(T)$ is the viscosity of the second curved glass substrate at temperature (T), t2 is the thickness of the second curved glass substrate, wherein one of or both the first major surface or the fourth major surface exhibits an optical distortion of less than 200 millidiopters as measured by an optical distortion detector using transmission optics according to ASTM 1561, and wherein the first major surface or the second major surface comprises a membrane tensile stress of less than 7 MPa as measured by a surface stressmeter, according to ASTM C1279.

9. The vehicle of claim 8, wherein, at a temperature of 630° C., the second viscosity is in a range from about 10 times the first viscosity to about 750 times the first viscosity.

10. The vehicle of claim 8, wherein the second thickness is less than the first thickness.

11. The vehicle of claim 8, wherein the first curved glass substrate comprises a first sag temperature and the second curved glass substrate comprises a second sag temperature that differs from the first sag temperature.

12. The vehicle of claim 8, wherein the laminate is substantially free of visual distortion as measured by ASTM C1652/C1652M.

13. The laminate of claim 8, wherein one of or both the first curved glass substrate or the second curved glass substrate comprises a compressive stress region and a central tension region formed by a coefficient of thermal expansion difference between portions of the corresponding curved glass substrate that mechanically strengthens the corresponding curved glass substrate.

14. A method of forming the curved laminate of claim 1, the method comprising:
forming a stack comprising a first glass substrate and a second glass substrate, the first glass substrate comprising the first viscosity and a first sag temperature, the second glass substrate comprising the second viscosity greater than the first viscosity at a temperature of 630° C. and a second sag temperature that differs from the first sag temperature; and heating the stack and co-shaping the stack to form a co-shaped stack, the co-shaped stack comprising the first curved glass substrate having the first sag depth and the second curved glass substrate having the second sag depth, the first curved glass substrate formed from the first glass substrate, and the second curved glass substrate formed from the second glass substrate.

15. The method of claim 14, wherein one of or both the first curved glass substrate or the second curved glass substrate comprises a compressive stress region and a central tension region formed by a coefficient of thermal expansion difference between portions of the corresponding curved glass substrate that mechanically strengthens the corresponding curved glass substrate.

16. The method of claim 14, wherein the second glass substrate is disposed on the first glass substrate or the first glass substrate is disposed on the second glass substrate.

17. The method of claim 14, wherein heating the stack comprises heating the stack to a temperature different from the first sag temperature and the second sag temperature, heating the stack to a temperature between the first sag temperature and the second sag temperature, or heating the stack to the first sag temperature or the second sag temperature.

18. The method of claim 14, further comprising placing the stack on a female mold and heating the stack on the female mold, wherein co-shaping the stack comprises sagging the stack through an opening in the female mold using gravity.

19. The method of claim 18, further comprising applying a vacuum to the stack to facilitate co-shaping the stack.

20. The method of claim 14, further comprising generating a vacuum force between the first glass substrate and the second glass substrate.

21. The method of claim 14, further comprising forming a temporary bond between the first glass substrate and the second glass substrate, wherein the temporary bond comprises a vacuum force.

22. The method of claim 14, further comprising inserting an interlayer between the first curved glass substrate and the second curved glass substrate, and laminating the first curved glass substrate, the interlayer, and the second curved glass substrate together.

* * * * *